(12) United States Patent
Shirano

(10) Patent No.: US 7,668,837 B2
(45) Date of Patent: Feb. 23, 2010

(54) MULTIPLEX APPARATUS AND METHOD FOR MULTIPLEXING LEGACY DEVICE

(75) Inventor: Yasuyuki Shirano, Tokyo (JP)

(73) Assignee: NEC Corporation, Tokyo (JP)

( * ) Notice: Subject to any disclaimer, the term of this patent is extended or adjusted under 35 U.S.C. 154(b) by 347 days.

(21) Appl. No.: 11/311,283

(22) Filed: Dec. 20, 2005

(65) Prior Publication Data

US 2006/0136607 A1 Jun. 22, 2006

(30) Foreign Application Priority Data

Dec. 21, 2004 (JP) ............................. 2004-370255

(51) Int. Cl.
*G06F 7/00* (2006.01)
*G06F 17/30* (2006.01)

(52) U.S. Cl. ......................... 707/10; 710/52

(58) Field of Classification Search .............. 707/1–10, 707/100–104.1, 200–206; 710/100, 1–7, 710/52, 53, 56, 310; 713/150
See application file for complete search history.

(56) References Cited

U.S. PATENT DOCUMENTS 6,370,593 B1 * 4/2002 Larson ........................... 710/1
7,221,647 B2 * 5/2007 Moriwaki et al. ........... 370/230

FOREIGN PATENT DOCUMENTS

| JP | 64-042756 | 2/1989 |
|---|---|---|
| JP | 05-298204 | 11/1993 |
| JP | 9-146853 | 6/1997 |
| JP | 11-232206 | 8/1999 |

OTHER PUBLICATIONS

Sarnaik et al., Effects of resource utilization monitoring in fault recovery, Jun. 15-17, 1994, IEEE, 6-15.*
Gunjan Khanna et al., Failure handling in a reliable multicast protocol for improving buffer utilization and accommodating heterogeneous receivers, Mar. 3-5, 2004, IEEE, 15-24.*
Japanese Patent Office issued a Japanese Office Action dated Sep. 18, 2009, Application No. 2004-370255, All Pages.

* cited by examiner

*Primary Examiner*—Jean B Fleurantin
(74) *Attorney, Agent, or Firm*—Young & Thompson

(57) ABSTRACT

A multiplex apparatus includes a plurality of systems configured to be connected to each other by links. Each of the plurality of systems includes a CPU, a pseudo legacy device and a legacy device. The pseudo legacy device is configured to be electrically connected to the CPU. The legacy device is configured to be electrically connected to the pseudo legacy device. The pseudo legacy device includes a request buffer and a pseudo operator. The request buffer is configured to store a request when the CPU sends the request through the pseudo legacy device to the legacy device. The pseudo operator is configured to execute an emulation with regard to the legacy device based on the request, and store the emulation result including an inside status of the legacy device.

13 Claims, 12 Drawing Sheets

MULTIPLEX APPARATUS AND METHOD FOR MULTIPLEXING LEGACY DEVICE

BACKGROUND OF THE INVENTION

1. Field of the Invention

The present invention relates to a multiplex apparatus and a method for multiplexing a legacy device. More particularly, the present invention relates to a multiplex apparatus and a method for multiplexing a legacy device, in which a legacy device is multiplexed by using a pseudo legacy device.

2. Description of the Related Art

In recent years, computer system is commonly constructed using industrial standard technologies A multiplex system, which has been conventionally constructed with a special-purpose operating system and special-purpose hardware, also has been constructed with a general-purpose operating system and general-purpose hardware.

However, the general-purpose operating system has not always been designed in consideration of the multiplex system. As a consequence, there have been arisen several problems in constructing the multiplex system. In such problems, a method for multiplexing a legacy device has become particularly serious. An address of the legacy device is fixed on the precondition that there is only one address in the system. Therefore, if the operating system detects a trouble in the legacy device, the operating system may stop operations hereafter. Thus, the multiplex system needs to be configured such that even if a trouble occurs in the legacy device, such a trouble is transparent to the operating system.

There has been conventionally used a method for replacing a module of an operating system (hereinafter referred to as "an OS"), which accesses to the legacy device, with another module, so as to achieve the fail-over of the legacy device. In this method, the replaced module has trapped a request issued from the OS to the legacy device. In this way, even in the case that an improper response is returned from the legacy device, a processing can be continued without notifying the operating system of the response. However, this method has raised some problems, as described below.

A first problem is that since a vender of an OS normally does not allow a source code to be opened, the source code need to be offered from the vender of the OS in order to replace the module. Therefore, this method cannot be used for the system with the OS whose source code cannot be offered. That is to say, the OS, which can achieve the fail-over, is limited.

A second problem is that maintenance of the system hereafter is markedly degraded due to the replacement of the module in the OS. The vender of the OS, as needed, releases security patches with respect to a security hole found out after shipment. However, before applying the patches, it is necessary to consider an adverse effect from the patches to the replaced module. Therefore, it becomes difficult to apply the patches on a side of a user. In other words, the replacement of the module in the OS markedly degrades the maintenance of the system hereafter In conjunction with the above description, Japanese Laid Open Patent Application (JP-A-Heisei, 11-232206) discloses an input/output control circuit. This input/output control circuit is interposed between a microprocessor and an input/output circuit, for controlling transmission of data between the microprocessor and the input/output circuit. Here, the microprocessor accesses to a memory which finishes an access operation at a predetermined access timing through a memory control line. The input/output circuit is featured by including (a) a memory interface and (b) an emulator. The memory interface is connected to the memory control line, so as to input an access request, which is outputted from the micro processor through the memory control line. The emulator outputs a response to the access request, which has been received from the memory interface, to the microprocessor at the same access timing as the above-described predetermined access timing.

Additionally, Japanese Laid Open Patent Application (JP-A-Heisei, 9-146853) discloses a duplicated calculator and a method for recovering from a trouble. The duplicated calculator includes duplicated processors (duplicated CPUs), duplicated input/output devices (duplicated I/Os), a duplicated system bus for connecting the duplicated CPU and the duplicated I/O to each other, and an I/O bus. The duplicated CPUs operate synchronously with each other. The duplicated I/Os operate synchronously with each other. In the case that a trouble occurs in the CPU or the I/O in one system, the CPU and the I/O in the other system continue an operable state. Then, the CPU and the I/O in the system, in which the trouble occurs, can be subjected to maintenance, replacement and re-assembly. The duplicated calculator further includes state storing means which stores its own state in each of the systems, and I/O bus connection selecting means which selects connection of the CPU in its own system to the I/O in its own system or the I/O in the other system. During the maintenance and replacement, only the connection of the CPU in its own system to the I/O in its own system is selected in each of the systems.

SUMMARY OF THE INVENTION

Therefore, an object of the present invention is to provide a multiplex apparatus and a method for multiplexing a legacy device, in which a legacy device can be multiplexed without changing a module in an operating system.

Another object of the present invention is to provide a multiplex apparatus and a method for multiplexing a legacy device, in which the fail-over of a timer can be achieved without changing a module in an operating system.

This and other objects, features and advantages of the present invention will be readily ascertained by referring to the following description and drawings.

In order to achieve an aspect of the present invention, the present invention provides a multiplex apparatus including a plurality of systems configured to be connected to each other by links. Each of the plurality of systems includes a CPU, a pseudo legacy device and a legacy device. The pseudo legacy device is configured to be electrically connected to the CPU. The legacy device is configured to be electrically connected to the pseudo legacy device. The pseudo legacy device includes a request buffer and a pseudo operator. The request buffer is configured to store a request when the CPU sends the request through the pseudo legacy device to the legacy device. The pseudo operator is configured to execute an emulation with regard to the legacy device based on the request, and store the emulation result including an inside status of the legacy device.

In the multiplex apparatus, the pseudo legacy device may further include a response buffer, a comparison error detector and an operation unit. The response buffer is configured to store a response to the request from the legacy device. The comparison error detector is configured to compare the response outputted from the response buffer with an expectation value outputted from the pseudo operator, wherein the expectation value is obtained by the emulation. The operation unit is configured to output the expectation value as the response to the CPU, when discrepancy occurs between the response and the expectation value, based on the comparison result.

The multiplex apparatus may further include an interrupt controller configured to output an interrupt to the CPU based on a received notification of interrupt. The operation unit may output the notification of interrupt to the interrupt controller, when discrepancy occurs between the response and the expectation value based on the comparison result.

In the multiplex apparatus, the pseudo legacy device may further include a response buffer, a time-out detector and an operation unit. The response buffer is configured to store a response to the request in the legacy device. The time-out detector is configured to detect a time-out in which the response buffer cannot receive the response in a predetermined period of time after the request buffer receives the request. The operation unit is configured to output an expectation value as the response to the CPU based on the time-out, wherein the expectation value is obtained by the emulation, and outputted from the pseudo operator.

The multiplex apparatus may further include an interrupt controller configured to output an interrupt to the CPU based on a received notification of interrupt. The pseudo legacy device may include a comparison error detector configured to compare the response outputted from the response buffer with the expectation value outputted from the pseudo operator. The operation unit may output the notification of interrupt to the interrupt controller, when discrepancy occurs between the response and the expectation value based on the comparison result.

In the multiplex apparatus, the operation unit may output the notification of interrupt to the interrupt controller based on the time-out.

In the multiplex apparatus, the legacy device may be a timer, and the pseudo legacy device may be a pseudo timer.

In order to achieve another aspect of the present invention, the present invention provides a method for multiplexing a legacy device, including (a) providing a computer system which includes: a plurality of systems configured to be connected to each other by links, wherein each of the plurality of systems includes: a CPU, a pseudo legacy device configured to be electrically connected to the CPU, and a legacy device configured to be electrically connected to the pseudo legacy device; (b) storing a request when the CPU sends the request through the pseudo legacy device to the legacy device by the pseudo legacy device; (c) executing an emulation with regard to the legacy device based on the request by the pseudo legacy device; and (d) storing the emulation result including an inside status of the legacy device by the pseudo legacy device.

The method for multiplexing a legacy device may further include (e) storing a response to the request from the legacy device by the pseudo legacy device; (f) comparing the response with an expectation value by the pseudo legacy device, wherein the expectation value is obtained by the emulation; and (g) outputting the expectation value as the response to the CPU, when discrepancy occurs between the response and the expectation value based on the comparison result, by the pseudo legacy device.

The method for multiplexing a legacy device may further include (h) outputting a notification of interrupt to an interrupt controller by the pseudo legacy device, when discrepancy occurs between the response and the expectation value based on the comparison result. The interrupt controller may output an interrupt to the CPU based on the received notification of interrupt.

The method for multiplexing a legacy device may further include (i) detecting a time-out by the pseudo legacy device, wherein the time-out is that the pseudo legacy device cannot receive the response in a predetermined period of time after the pseudo legacy device receives the request; and (j) outputting an expectation value as the response to the CPU based on the time-out by the pseudo legacy device, wherein the expectation value is obtained by the emulation.

The method for multiplexing a legacy device may further include (k) storing a response to the request from the legacy device by the pseudo legacy device; (l) comparing the response with an expectation value by the pseudo legacy device, wherein the expectation value is obtained by the emulation; and (m) outputting a notification of interrupt to an interrupt controller by the pseudo legacy device, when discrepancy occurs between the response and the expectation value based on the comparison result. The interrupt controller may output an interrupt to the CPU based on the received notification of interrupt.

The method for multiplexing a legacy device may further include (n) outputting the notification of interrupt to the interrupt controller based on the time-out by the pseudo legacy device.

In the method for multiplexing a legacy device, the legacy device may be a timer, and the pseudo legacy device may be a pseudo timer.

DESCRIPTION OF THE PREFERRED EMBODIMENTS

Embodiments of a multiplex apparatus and a method for multiplexing a legacy device according to the present invention will be described below with reference to the attached drawings.

A First Embodiment

Figure 1:
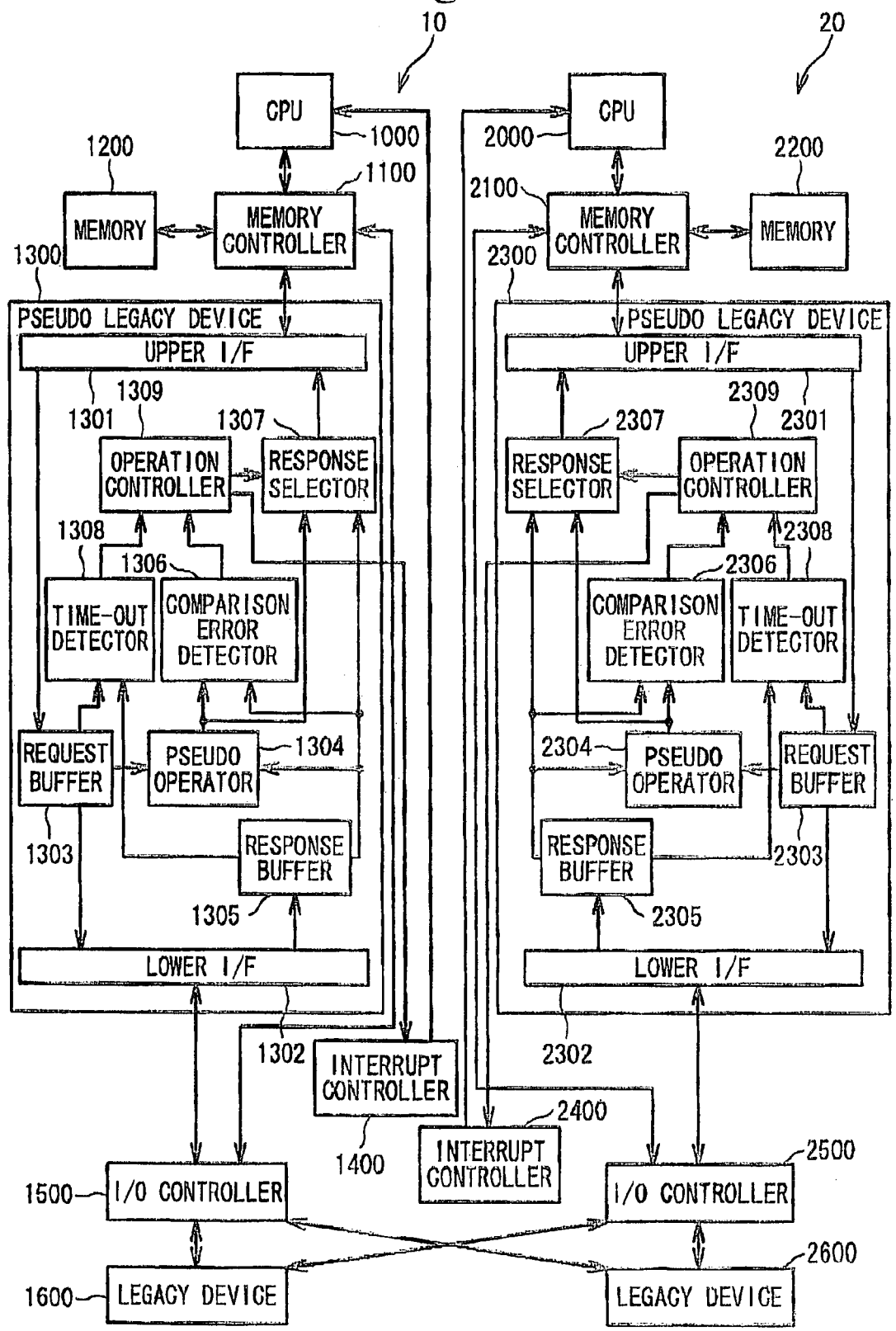
FIG. 1 is a block diagram showing the configuration of the multiplex apparatus in the first embodiment according to the present invention.

A configuration of a multiplex apparatus in the first embodiment will be described with reference to the attached drawings. FIG. 1 is a block diagram showing the configuration of the multiplex apparatus in the first embodiment according to the present invention. The multiplex apparatus includes a first system 10 and a second system 20, which are exemplified by a duplicated computer system (which is one example of multiplexed computer systems). The first system 10 includes a CPU 1000, a memory controller 1100, a memory 1200, a pseudo legacy device 1300, an interrupt controller 1400, an I/O controller 1500 and a legacy device 1600. Similarly, the second system 20 includes a CPU 2000, a memory controller 2100, a memory 2200, a pseudo legacy device 2300, an interrupt controller 2400, an I/O controller 2500 and a legacy device 2600.

Here, an explanation will be basically made on a multiplex apparatus of a lockstep system. Specifically, the CPUs 1000 and 2000, the memory controllers 1100 and 2100, the memories 1200 and 2200, the pseudo legacy devices 1300 and 2300, and the interrupt controllers 1400 and 2400 shown in FIG. 1 perform a lockstep operation. As to the legacy devices 1600 and 2600, either one is actively operated while the other stands by. Hereinafter, the configuration of the only first system 10 will be described. However, the configuration of the second system 20 (reference numerals on the order of 2000) is the same as that of the first system 10.

During a normal operation, an operating system (hereinafter refereed to as "an OS") operates in the CPU 1000. The OS accesses to the memory 1200, the I/O controller 1500 and an I/O device under the control of the I/O controller 2500. When a system management interrupt (referred to as "a SMI") is notified, the CPU 1000 switches operation to a system management interrupt handler inside of a BIOS (not shown), after a while. Upon completion of processing by the system management interrupt handler, the CPU 1000 switches the operation to the OS.

In the case that a request is issued from the OS or the BIOS operated by the CPU 1000 to the legacy device, the memory controller 1100 transmits the request to the pseudo legacy device 1300. The memory controller 1100 receives a response to the request from the pseudo legacy device 1300. In the case of a request for a device other than the legacy device 1600, the memory controller 1100 transmits the request to the I/O controller 1500. Thereafter, the memory controller 1100 receives a response to the request from the I/O controller 1500.

The pseudo legacy device 1300 includes an upper I/F 1301, a lower I/F 1302, a request buffer 1303, a pseudo operator 1304, a response buffer 1305, a comparison error detector 1306, a response selector 1307, a time-out detector 1308 and an operation controller 1309.

The upper I/F 1301 receives the request for the legacy device 1600, and then, transmits the request to the request buffer 1303. Moreover, the upper I/F 1301 receives a response to the request through the response selector 1307, and then, transmits the response to the memory controller 1100.

The request buffer 1303 holds therein the request transmitted from the upper I/F 1301. At the same time, the request buffer 1303 transmits the request to the lower I/F 1302.

The lower I/F 1302 transmits the request transmitted from the request buffer 1303 to the I/O controller 1500. The lower I/F 1302 receives a response from the I/O controller 1500, and then, transfers the received response to the response buffer 1305.

Upon receipt of the response transmitted from the I/O controller 1500, the response buffer 1305 notifies the pseudo operator 1304 of the reception of the response.

When the pseudo operator 1304 is notified of the reception of the response from the response buffer 1305, the pseudo operator 1304 acquires the request corresponding to the response from the request buffer 1303. Thereafter, the pseudo operator 1304 grasps the inside condition of the legacy device 1600 by executing emulation based on the acquired request, and then, stores (i.e., updates) the inside condition therein. At the same time, the pseudo operator 1304 generates an expectation value for the response with respect to the acquired request by executing emulation. The pseudo operator 1304 notifies the comparison error detector 1306 of the expectation value. At this time, the acquired request is deleted from the request buffer 1303.

The comparison error detector 1306 compares the expectation value generated by the pseudo operator 1304 with the response received from the legacy device, so as to confirm the occurrence of discrepancy. In the case that discrepancy occurs, the comparison error detector 1306 notifies the operation controller 1309 of the occurrence of discrepancy.

The time-out detector 1308 monitors the request buffer 1303 and the response buffer 1305. If the time-out detector 1308 detects the request without any return of a response for a predetermined period of time or longer, the time-out detector 1308 notifies the operation controller 1309 of that matter.

The operation controller 1309 judges whether or not a trouble occurs in the legacy device 1600 based on the notifications from the comparison error detector 1306 and the time-out detector 1308. Then, the operation controller 1309 controls an operating mode. If a trouble occurs in the legacy device, the operation controller 1309 notifies the interrupt controller 1400 of that matter.

The response selector 1307 outputs either one of the response from the pseudo operator 1304 and the response from the response buffer 1305 to the upper I/F 1301 based on an instruction by the operation controller 1309.

The I/O controller 1500 transmits the request issued by the CPU 1000 or the pseudo legacy device 1300 to an active one of the legacy device 1600 and the legacy device 2600. The I/O controller 1500 transmits the response from the legacy device 1600 or the legacy device 2600 to the CPU 1000 or the pseudo legacy device 1300.

The interrupt controller 1400 receives the notification of the occurrence of the trouble in the legacy device from the operation controller 1309. Then, the interrupt controller 1400 performs interrupt in the CPU 1000 based on the trouble.

Next, a method for multiplexing a legacy device (i.e., an operation of the multiplex apparatus, to which the pseudo legacy device is applied) in the first embodiment according to the present invention will be described with reference to the attached drawings. Here, it is assumed that the legacy device 1600 is active while the legacy device 2600 stands by.

Incidentally, a cross bridge and an I/O bus (which will be described in a third embodiment) are omitted in this embodiment since they are irrelevant directly to operation.

Figure 2:
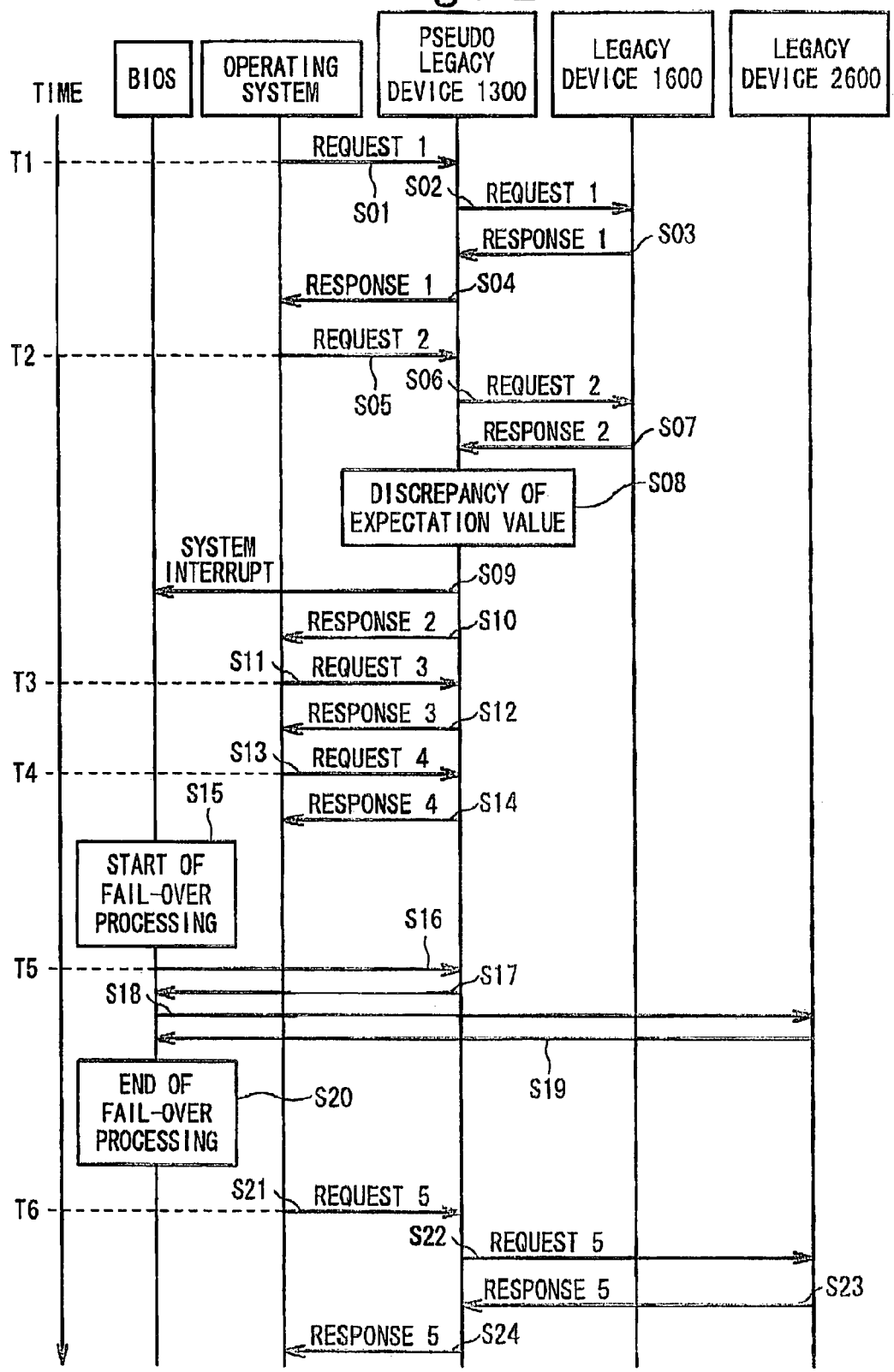
FIG. 2 is a timing chart showing the operation of the multiplex apparatus in the first embodiment according to the present invention.

FIG. 2 is a timing chart showing the operation of the multiplex apparatus (the method for multiplexing a legacy device) in the first embodiment according to the present invention.

Firstly, a normal operation will be described.

At a time T1, the operating system (the OS=the CPU 1000) creates a request 1 for the legacy device 1600. The OS transmits the request 1 to the pseudo legacy device 1300 through the memory controller 1100. And then, the pseudo legacy device 1300 receives the request 1 (step S01).

The upper I/F 1301 in the pseudo: legacy device 1300 transmits the received request 1 to the request buffer 1303. The request buffer 1303 holds the request 1 therein, and further, transmits the request 1 to the lower I/F 1302, The lower I/F 1302 transmits the request 1 to the I/O controller 1500. The I/O controller 1500 transmits the request 1 to the legacy device 1600 (step S02).

The legacy device 1600 generates a response 1 in response to the request 1, and then, transmits the response 1 to the I/O controller 1500. The I/O controller 1500 transmits the received response 1 to the pseudo legacy device 1300 (step S03).

The lower I/F 1302 in the pseudo legacy device 1300 transmits the received response 1 to the response buffer 1305. The response buffer 1305 holds the response 1 therein. The response buffer 1305 notifies the pseudo operator 1304 of the reception of the response 1. The pseudo operator 1304 obtains the request 1 corresponding to the response 1 received by the response buffer 1305 from the request buffer 1303. Then, the pseudo operator 1304 performs a pseudo operation (i.e., the emulation) with respect to the legacy device 1600. In this pseudo operation, the inside condition of the legacy device 1600 stored in the pseudo operator 1304 is updated, and further, an expectation value 1 for the response corresponding to the request 1 is generated. The comparison error detector 1306 compares the expectation value 1 generated by the pseudo operator 1304 with the response 1, and then, transmits the comparison result to the operation controller 1309. In the case that there occurs no discrepancy between the expectation value 1 and the response 1, the operation controller 1309 instructs the response selector 1307 to return the response 1 transmitted from the legacy device 1600 to the OS. The response 1 transmitted from the legacy device 1600 is stored in the response buffer 1305. The response selector 1307 receives the response 1 from the response buffer 1305, and then, outputs the response 1 to the OS through the upper I/F 1301 (step S04).

When the legacy device is normally operated, a method for multiplexing the legacy device according to the present invention is implemented as described above.

Subsequently, the case that a trouble occurs in the legacy device 1600 will be described below.

At a time T2, the OS creates a request 2 for the legacy device 1600. The OS transmits the request 2 to the pseudo legacy device 1300 through the memory controller 1100. Then, the pseudo legacy device 1300 receives the request 2 (step S05).

The upper I/F 1301 in the pseudo legacy device 1300 transmits the received request 2 to the request buffer 1303. The request buffer 1303 holds the request 2 therein, and further, transmits the request 2 to the lower I/F 1302. The lower I/F 1302 transmits the request 2 to the I/O controller 1500. The I/O controller 1500 transmits the request 2 to the legacy device 1600 (step S06).

The legacy device 1600 generates a response 2 in response to the request 2, and then, transmits the response 2 to the I/O controller 1500. The I/O controller 1500 transmits the received response 2 to the pseudo legacy device 1300 (step S07).

The lower I/F 1302 in the pseudo legacy device 1300 transmits the received response 2 to the response buffer 1305. The response buffer 1305 holds the response 2 therein. The response buffer 1305 notifies the pseudo operator 1304 of the reception of the response 2. The pseudo operator 1304 obtains the request 2 corresponding to the response 2 received by the response buffer 1305 from the request buffer 1303. Then, the pseudo operator 1304 performs the pseudo operation, thereby generating an expectation value 2 for the response corresponding to the request 2. The comparison error detector 1306 compares the expectation value 2 generated by the pseudo operator 1304 with the response 2, and then, transmits the comparison result to the operation controller 1309. The operation controller 1309 recognizes that there occurs discrepancy between the expectation value 2 and the response 2 (step S08).

The operation controller 1309 notifies the CPU 1000 of a system interrupt through the interrupt controller 1400 (step S09).

In parallel to this notification, the operation controller 1309 instructs the response selector 1307 to return the expectation value 2 generated by the pseudo operator 1304 to the OS. The response selector 1307 receives the expectation value 2 from the pseudo operator 1304, and then, outputs the expectation value 2 as the response 2 to the OS through the upper I/F 1301 (step S10) Thereafter, requests 3 and 4 for the legacy device 1600 issued by the OS at times T3 and T4 (steps S11 and S13), respectively, cannot be transmitted to the legacy device 1600. However, expectation values 3 and 4, which are generated in the pseudo legacy device 1300, are returned to the OS as responses 3 and 4 (steps S12 and S14) respectively. During this operation, the pseudo operator 1304 emulates the inside condition of the legacy device 1600 based on the contents of the requests 3 and 4, and thus, generates the expectation values 3 and 4.

At a time T5, the BIOS starts a fail-over processing (step S15). The BIOS refers to the inside condition of the legacy device 1600. The inside condition is stored in the pseudo operator 1304 (steps S16 and S17). The BIOS sets the legacy device 2600 based on the inside condition of the legacy device 1600 (steps S18 and S19). In this way, the BIOS ends the fail-over processing (step S20).

Upon completion of the fail-over processing, the operation is started while the legacy device 2600 is in an active state. At a time T6, the OS creates a request 5, and then, transmits the request 5 to the legacy device 2600 (step S22) through the pseudo legacy device 1300 and the I/O controller 1500 (step S21). The legacy device 2600 generates a response 5, and then, returns the response 5 to the OS (step S24) through the pseudo legacy device 1300 and the I/O controller 1500 (step S23).

As described above, the method for multiplexing the legacy device according to the present invention has been implemented in the case that the trouble occurs in the legacy device 1600.

Figure 3:
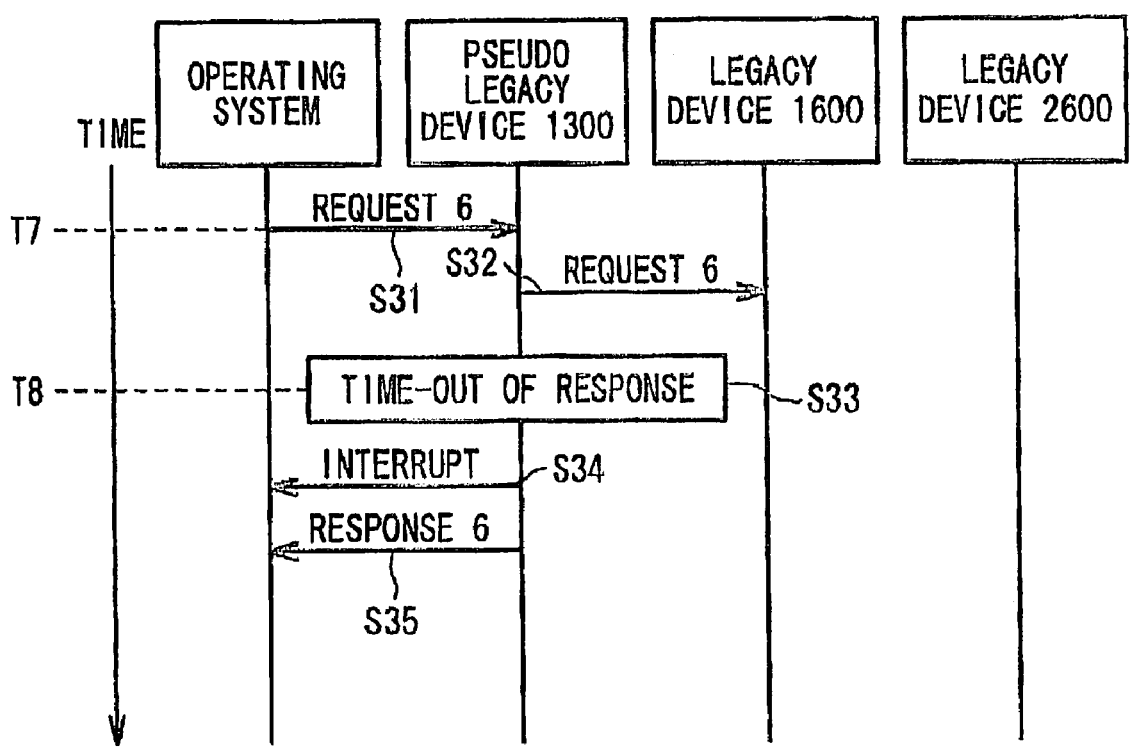
FIG. 3 is a timing chart showing another operation of the multiplex apparatus in the first embodiment according to the present invention.

FIG. 3 is a timing chart showing another operation of the multiplex apparatus (the method for multiplexing a legacy device) in the first embodiment according to the present invention.

Here, the operation in the case that a time-out of a response occurs will be described.

At a time T7, the OS creates a request 6 for the legacy device 1600. The OS transmits the request 6 to the pseudo legacy device 1300 through the memory controller 1100. Then, the pseudo legacy device 1300 receives the request 6 (step S31). The pseudo legacy device 1300 transmits the request 6 to the legacy device 1600 through the I/O controller 1500 in the same step as described above (step S32).

At a time T8, the time-out detector 1308 monitors the request buffer 1303 and the response buffer 1305, and then, determines that a response 6 is not returned from the legacy device 1600 even after a lapse of a predetermined period of time $\Delta T$ (which is equal to a value obtained by subtracting the time T7 from the time T8) after the reception of the request 6.

The time-out detector 1308 notifies the operation controller 1309 of the occurring of the time-out of the response (step S33).

The operation controller 1309 recognizes the occurring of the time-out of the response. The operation controller 1309 notifies the CPU 1000 of a system management interrupt through the interrupt controller 1400 (step S34).

In parallel to this operation, the operation controller 1309 instructs the response selector 1307 to return an expectation value 6 for the response 6, generated by the pseudo operator 1304, to the OS. The response selector 1307 receives the expectation value 6 from the pseudo operator 1304, and then, outputs the expectation value 6 as the response 6 to the OS through the upper I/F 1301 (step S35). Thereafter, the fail-over processing in the legacy device 1600 (the above described steps S15 to S20) is started in the same manner as in the case that there occurs the discrepancy between the response and the expectation value.

As described above, the method for multiplexing a legacy device according to the present invention has been implemented in the case that the time-out of the response occurs.

In this manner, according to the present invention, the legacy device can be multiplexed without changing any module in the operating system by the function of the pseudo legacy device 1300.

A Second Embodiment

Figure 4:
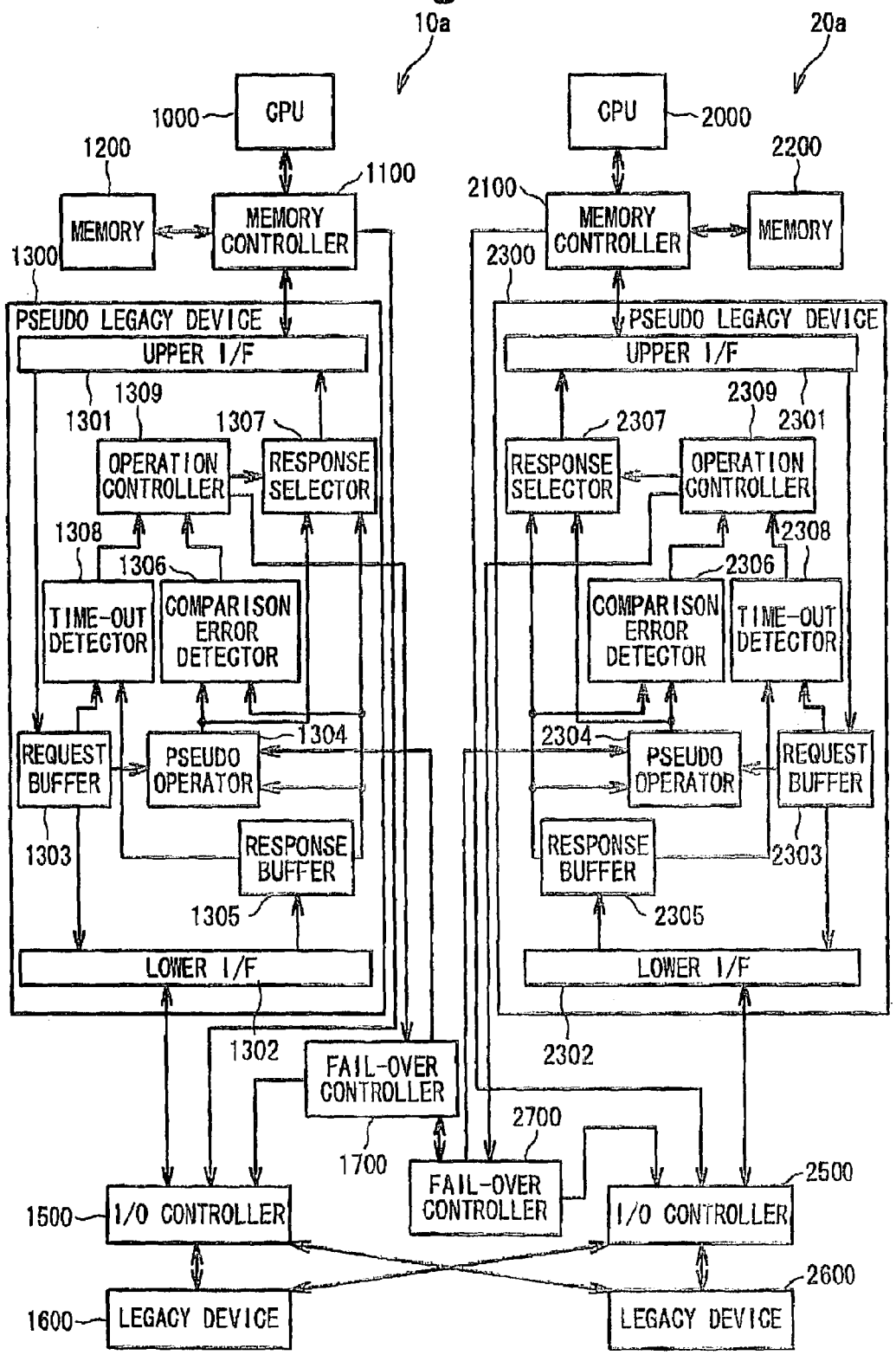
FIG. 4 is a block diagram showing the configuration of the multiplex apparatus in the second embodiment according to the present invention.

A configuration of a multiplex apparatus in the second embodiment will be described with reference to the attached drawings. FIG. 4 is a block diagram showing the configuration of the multiplex apparatus in the second embodiment according to the present invention. In comparison with the first embodiment shown in FIG. 1, the interrupt controllers 1400 and 2400 are replaced with fail-over controllers 1700 and 2700 in the multiplex apparatus in the second embodiment.

In the first embodiment shown in FIG. 1, the CPU 1000 executes the fail-over processing. In contrast, the fail-over controller 1700 executes the fail-over processing in this embodiment shown in FIG. 4. Specifically, if there occurs an error in the expectation value generated by the pseudo operator 1304 in the first embodiment shown in FIG. 1, the CPU 1000 (i.e., the operating system referred to as "the OS") may also be erroneously operated. In contrast, the expectation value generated by the pseudo legacy device is not returned to the OS in this embodiment shown in FIG. 4, so that the OS cannot be erroneously operated.

The other configurations are the same as those in the first embodiment, and therefore, the explanation will be omitted.

Figure 5:
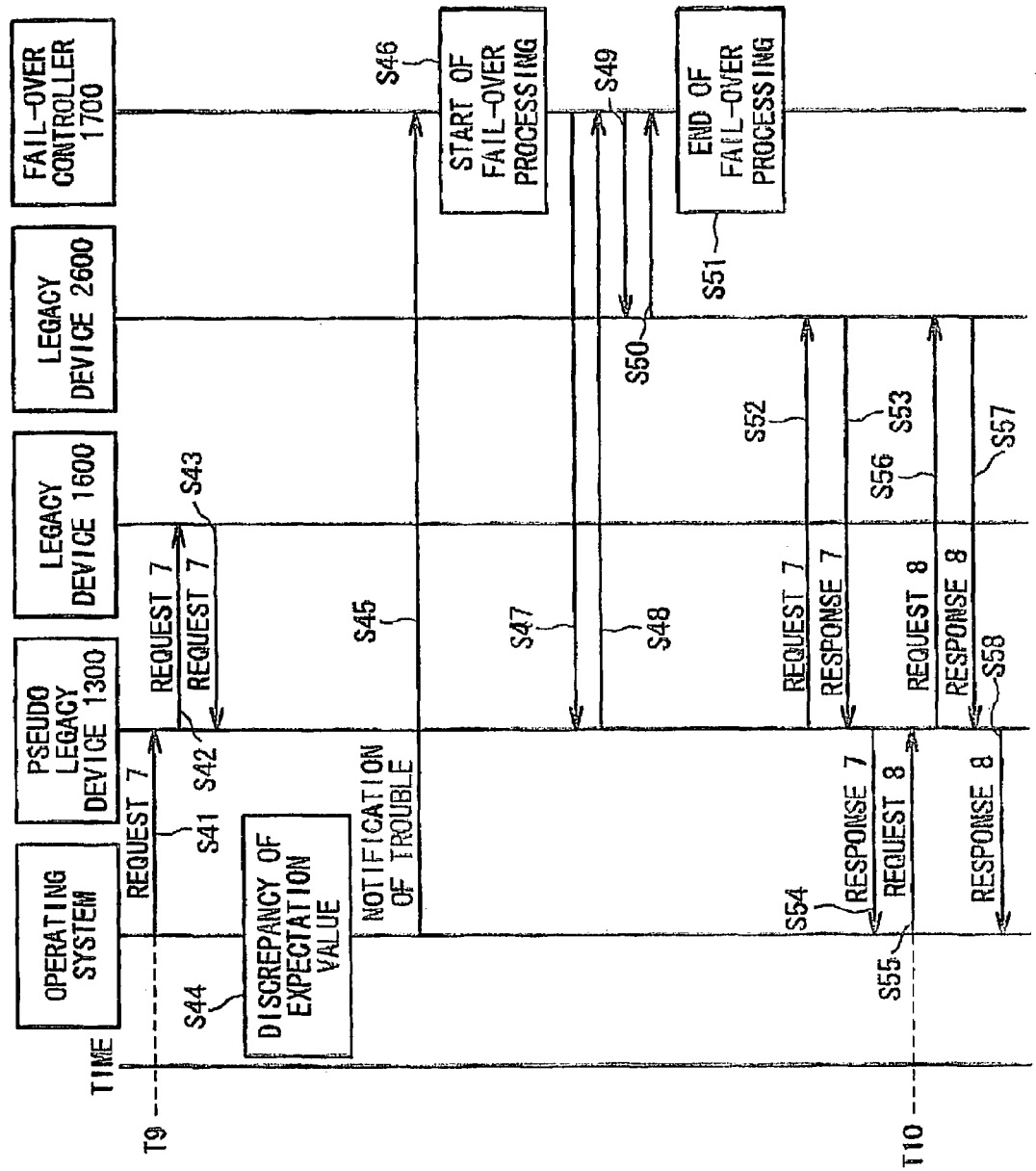
FIG. 5 is a timing chart showing the operation of the multiplex apparatus in the second embodiment according to the present invention.

FIG. 5 is a timing chart showing the operation of the multiplex apparatus (the method for multiplexing a legacy device) in the second embodiment according to the present invention. Also in this embodiment, it is assumed that a legacy device 1600 is active while a legacy device 2600 stands by.

The normal operation is the same as that in the first embodiment, and therefore, the explanation will be omitted Here, the operation in the case that a trouble occurs in the legacy device 1600 will be described below.

At a time T9, the OS (i.e., the CPU 1000) creates a request 7 for the legacy device 1600. The OS transmits the request 7 to a pseudo legacy device 1300 through a memory controller 1100. Then, the pseudo legacy device 1300 receives the request 7 (step S41).

An upper I/F 1301 in the pseudo legacy device 1300 transmits the received request 7 to a request buffer 1303. The request buffer 1303 holds the request 7 therein, and further, transmits the request 7 to a lower I/F 1302. The lower I/F 1302 transmits the request 7 to an I/O controller 1500. The I/O controller 1500 transmits the request 7 to the legacy device 1600 (step S42).

The legacy device 1600 generates a response 7 in response to the request 7, and then, transmits the response 7 to the I/O controller 1500. The I/O controller 1500 transmits the received response 7 to the pseudo legacy device 1300 (step S43).

The lower I/F 1302 in the pseudo legacy device 1300 transmits the received response 7 to a response buffer 1305. The response buffer 1305 holds the response 7 therein. The response buffer 1305 notifies a pseudo operator 1304 of the reception of the response 7. The pseudo operator 1304 obtains the request 7 corresponding to the response 7 received by the response buffer 1305 from the request buffer 1303, and then, performs a pseudo operation, thereby generating an expectation value 7 for the response corresponding to the request 7. The comparison error detector 1306 compares the expectation value 7 generated by the pseudo operator 1304 with the response 7, and then, transmits the comparison result to an operation controller 1309. The operation controller 1309 recognizes that there occurs discrepancy between the expectation value 7 and the response7 (step S44).

The operation controller 1309 notifies the fail-over controller 1700 of the occurrence of the discrepancy between the expectation value 7 and the response 7 (step S45).

When the fail-over controller 1700 is notified of the occurrence of a trouble in the legacy device by the operation controller 1309, the fail-over controller 1700 starts a fail-over processing (step S46) The fail-over controller 1700 refers to the inside condition of the legacy device 1600 (steps S47 and S48). The inside condition is stored in the pseudo operator 1304. The fail-over controller 1700 sets the legacy device 2600 through the I/O controller 1500 based on the inside condition of the legacy device 1600 (steps S49 and S50). In this way, the fail-over controller 1700 ends the fail-over processing (step S51).

Upon completion of the fail-over processing, the operation is started while the legacy device 2600 is in an active state. The request buffer 1303 in the pseudo legacy device 1300 transmits the request 7 to the legacy device 2600 through the lower I/F 1302 and the I/O controller 1500 (step S52). The legacy device 2600 generates the response 7 in response to the request 7, and then, returns the response 7 to the pseudo legacy device 1300 through the I/O controller 1500 (step S53). Thereafter, in the same manner as in the normal operation, the pseudo legacy device 1300 returns the response 7 to the OS. Thereafter, at a time T10, a request 8 for the legacy device, issued by the OS, is transmitted to the legacy device 2600 through the pseudo legacy device 1300 and the I/O controller 1500 (step S55, S56). Then, a response 8 in response to the request 8 outputted from the legacy device 2600 is transmitted to the OS through the pseudo legacy device 1300 and the I/O controller 1500 (step S57, S58).

In the second embodiment, the same effects as those in the first embodiment also can be obtained. In addition, the expectation value generated by the pseudo legacy device 1300 cannot be returned to the OS (i.e., the CPU 1000) in the second embodiment, thereby preventing any occurrence of an erroneous operation in the OS.

A Third Embodiment

Figure 6:
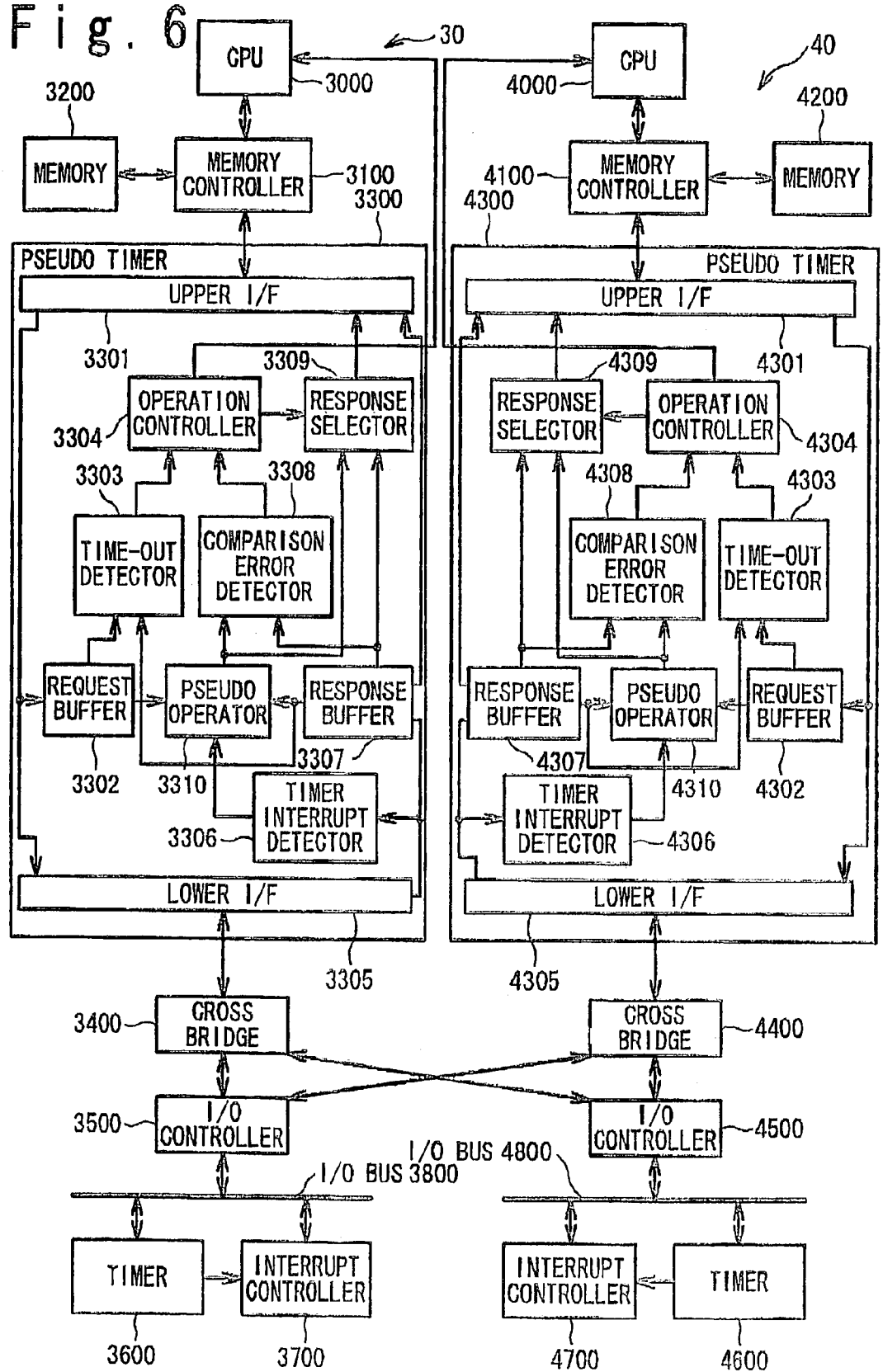
FIG. 6 is a block diagram showing the configuration of the multiplex apparatus in the third embodiment according to the present invention.

A configuration of a multiplex apparatus in the third embodiment will be described with reference to the attached drawings. FIG. 6 is a block diagram showing the configuration of the multiplex apparatus in the third embodiment according to the present invention. The multiplex apparatus includes a first system 30 and a second system 40, which are exemplified by a duplicated computer system (which is one example of multiplexed computer systems). The first system 30 includes a CPU 3000, a memory controller 3100, a memory 3200, a pseudo timer 3300, a cross bridge 3400, an I/O controller 3500, a timer 3600, an interrupt controller 3700, and an I/O bus 3800. Similarly, the second system 40 includes a CPU 4000, a memory controller 4100, a memory 4200, a pseudo timer 4300, a cross bridge 4400, an I/O controller 4500, a timer 4600, an interrupt controller 4700, and an I/O bus 4800.

Here, an explanation will be basically made on a multiplex apparatus of a lockstep system. Specifically, the CPUs 3000 and 4000, the memory controllers 3100 and 4100, the memories 3200 and 4200 and the pseudo timers 3300 and 4300 shown in FIG. 6 perform a lockstep operation. Furthermore, as to the I/O controllers 3500 and 4500, the timers 3600 and 4600 and the interrupt controllers 3700 and 4700, either one is actively operated while the other stands by. Hereinafter, the configuration of the only first system 30 will be described. However, the configuration of the second system 40 (reference numerals on the order of 4000) is the same as that of the first system 30.

During a normal operation, an operating system (hereinafter referred to as "an OS") is operated in the CPU 3000. The OS accesses to the memory 3200, the I/O controller 3500 and an I/O device under the control of the I/O controller 4500. When a system management interrupt (referred to as "an SMI") is notified, the CPU 3000 switches the operation to a system management interrupt handler inside of a BIOS (not shown) after a while. Upon completion of processing by the system management interrupt handler, the CPU 3000 switches the operation to the OS.

In the case where a request is issued from the OS or the BIOS to the I/O device, the memory controller 3100 transmits the request to the pseudo timer 3300. The memory controller 3100 receives a response to the request from the pseudo timer 3300.

Incidentally, in the case of a request for a device other than the timer 3600, the memory controller 3100 may transmit the request to the cross bridge 3400. In this case, the memory controller 3100 receives a response to the request from the cross bridge 3400. At this time, transmission/reception is performed through a wiring (not shown) between the memory controller 3100 and the cross bridge 3400.

The pseudo timer 3300 includes an upper I/F 3301, a request buffer 3302, a time-out detector-3303, an operation controller 3304, a lower I/F 3305, a timer interrupt detector 3306, a response buffer 3307, a comparison error detector 3308, a response selector 3309, and a pseudo operator 3310.

The upper I/F 3301 receives the request for the I/O device, and then, transmits the request to the lower I/F 3305 and the request buffer 3302. Moreover, when the upper I/F 3301 receives a response to or a request for the CPU 3000, the upper I/F 3301 transmits the response or the request to the memory controller 3100.

The request buffer 3302 judges whether or not the request transmitted from the upper I/F 3301 accesses to the timer 3600 or 4600, and then, holds a copy of the request in the case of the request for the timer 3600 or 4600.

The lower I/F 3305 transmits the request transmitted from the upper I/F 3301 to the cross bridge 3400. The lower I/F 3305 receives a response from the I/O device through the cross bridge 3400, and then, transmits the received response to the response buffer 3307.

Upon receipt of response data transmitted from the lower I/F 3305, the response buffer 3307 notifies the pseudo operator 3310 of the reception of the response data.

When the pseudo operator 3310 is notified of the reception of the response from the response buffer 3307, the pseudo operator 3310 acquires the request corresponding to the response from the request buffer 3302. The pseudo operator 3310 generates an expectation value for the response corresponding to the acquired request, and then, notifies the comparison error detector 3308 of the expectation value. At this time, the acquired request is deleted from the request buffer 3302.

The comparison error detector 3308 compares the expectation value generated by the pseudo operator 3310 with the response data received from the timer, so as to confirm whether or not discrepancy occurs. In the case that discrepancy occurs, the comparison error detector 3308 notifies the operation controller 3304 of the occurrence of discrepancy.

The time-out detector 3303 monitors the request buffer 3302 and the response buffer 3307. If the time-out detector 3303 detects the request without any return of a response for a predetermined period of time or longer, the time-out detector 3303 notifies the operation controller 3304 of that matter.

The operation controller 3304 judges whether or not a trouble occurs in the timer 3600, based on the notifications from the comparison error detector 3308 and the time-out detector 3303, and then, controls an operating mode. Here, if a trouble occurs in the timer, the operation controller 3304 issues a system management interrupt, which skips the OS, to the CPU 3000. The BIOS processes the system management interrupt while the OS cannot sense any generation of the system management interrupt.

The response selector 3309 outputs either one of the response in the pseudo operator 3310 and the response in the response buffer 3307 to the upper I/F 3301 based on an instruction by the operation controller 3304.

The timer interrupt detector 3306 detects an interrupt request output from the interrupt controller 3700, and then, notifies the pseudo operator 3310 of the interrupt request.

The cross bridge 3400 transmits the request issued by the pseudo timer 3300 to an active one of the timer 3600 and the timer 4600. The cross bridge 3400 transmits the response from the timer 3600 or the timer 4600 to the pseudo timer 3300. Moreover, the cross bridge 3400 receives the response from the I/O controller 3500 or the I/O controller 4500 and the interrupt request, and then, transmits them to the pseudo timer 3300.

The I/O controller 3500 transmits the request from the cross bridge 3400 or the cross bridge 4400 to the I/O bus 3800.

The timer 3600 receives the request from I/O bus 3800, and then, transmits the response to the I/O bus 3800. The timer 3600 is adapted to receive at least four requests for a counter mode setting, a counter value loading, a counter mode reading and a counter value reading.

A counter mode setting request is issued for setting an operating mode of a counter. The operating mode of the counter is set to at least a periodic interrupt mode or a one-shot interrupt mode according to a type of interrupt.

A counter value loading request is issued for loading a counter value of the timer 3600. The timer 3600 starts operation in a counter mode set at a timing when the counter value is loaded. The timer 3600 decrements the counter value by 1, and then, generates an interrupt at a timing when the counter value becomes 0.

In the case of the periodic interrupt mode, the counter value is reset to a finally loaded value when the counter value becomes 0, and then, the counter value is started to be counted again. In contrast, in the case of the one-shot interrupt mode, the operation is stopped at the timing when the counter value becomes 0.

The interrupt controller 3700 receives the interrupt from the timer 3600, and then, transmits an interrupt request to the I/O bus 3800.

Figure 7:
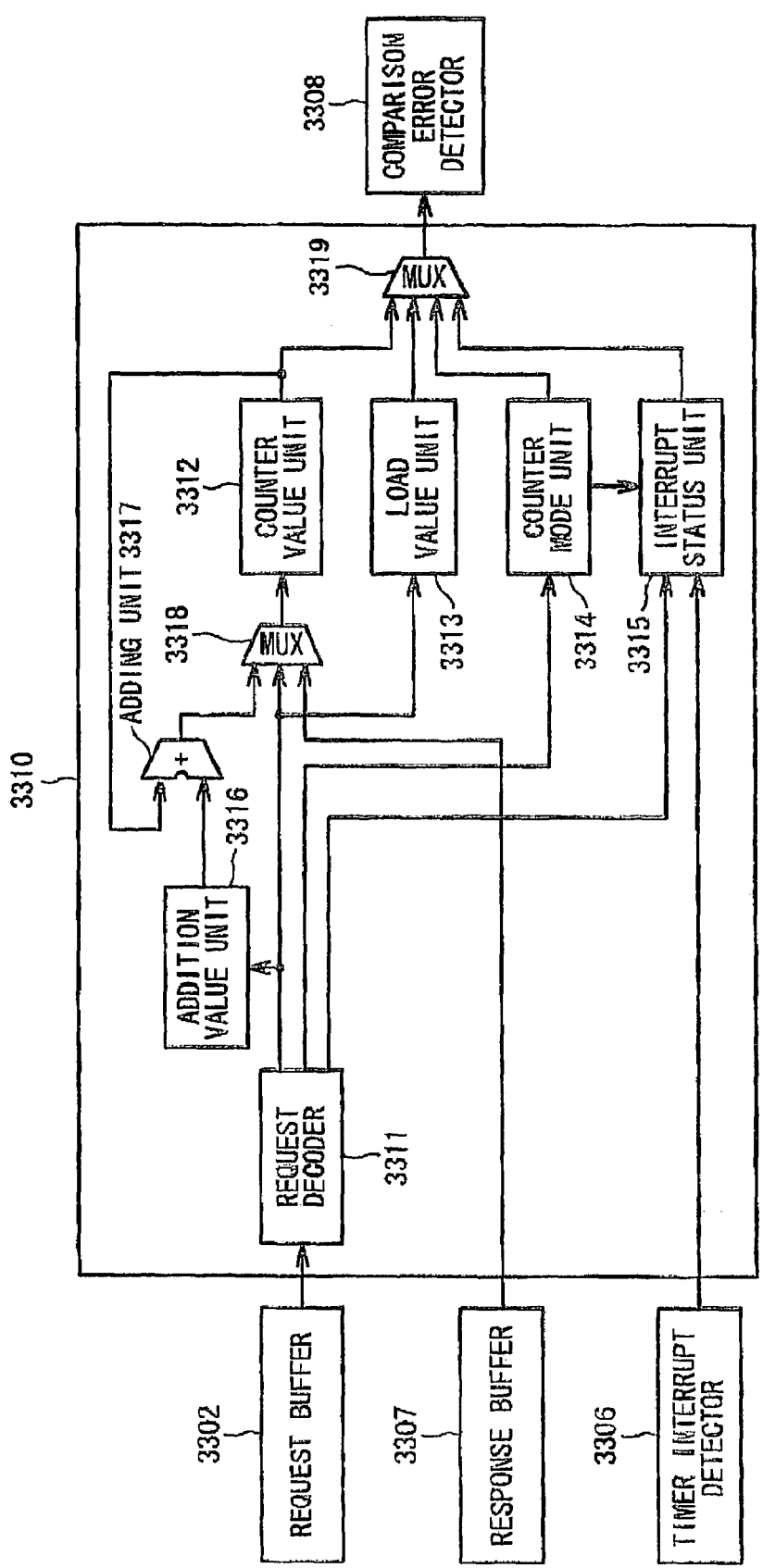
FIG. 7 is a block diagram showing the pseudo operator.

FIG. 7 is a block diagram showing the pseudo operator 3310. The pseudo operator 3310 includes a request decoder 3311, a counter value unit 3312, a load value unit 3313, a counter mode unit 3314, an interrupt status unit 3315, an addition value unit 3316, an adding unit 3317, an MUX 3318 and another MUX 3319. The counter value unit 3312 stores a counter value. The load value unit 3313 stores a load value. The counter mode unit 3314 stores a counter mode. The interrupt status unit 3315 stores an interrupt status. The addition value unit 3316 stores an addition value. The adding unit 3317 stores an adding result.

The request decoder 3311 decodes the request from the request buffer 3302, and further, updates the counter value (3312), the load value (3313), the counter mode (3314) and the interrupt status (3315) in the pseudo operator 3310. An updating method will be described below.

The counter value (3312) emulates the counter value in the timer 3600. Specifically, in the case that the counter value loading request (which is acquired from the request buffer 3302) is issued, the counter value (3312) is updated with a value to be loaded on the timer 3600.

In the case that the counter value reading request (which is acquired from the request buffer 3302) is issued, the counter value is updated with a value of the response (which is acquired from the response buffer 3307) received from the timer 3600.

In the case that the counter value reading request (which is acquired from the request buffer 3302) is issued during occurrence of a trouble in the timer 3600, a value obtained by adding the addition value (3316) to the counter value (3312) is returned as a return value, and thereafter, the counter value (3312) is updated with the return value. Here, the addition value 3316 is not always a positive value, and may be a negative value.

The load value (3313) is the value loaded on the timer 3600. Specifically, in the case that the value is loaded on a counter in the timer 3600 based on the counter value loading request (which is acquired from the request buffer 3302), the load value (3313) is the loaded value on the counter in the timer 3600. The load value (3313) is used for the fail-over of the timer 3600.

The counter mode (3314) is a mode set in the timer 3600. Specifically, in the case that the counter mode is set at the counter mode setting request (which is acquired from the request buffer 3302), the counter mode (3314) is the value set as the counter mode. Furthermore, the counter mode unit 3314 outputs a signal indicating whether the interrupt mode of the counter is periodic or one-shot, to the interrupt status unit 3315.

The interrupt status (3315) is a value indicating whether the one-shot interrupt is generated from the timer 3600. Specifically, 1 is set when the counting is started in a state that the timer 3600 is set in the one-shot interrupt mode based on the counter mode setting request (which is acquired from the request buffer 3302). In contrast, 0 is set when the timer interrupt detector 3306 notifies the occurrence of the timer interrupt. In the meantime, in the case that the timer is in the periodic interrupt mode, 0 is set at all times.

The addition value (3316) is a preset value. Here, the preset value is not always a positive value, and may be a negative value.

The MUX 3318 outputs an appropriate value to the counter value unit 3312 based on a decoded result of the request. The MUX 3319 outputs an appropriate expectation value to the comparison error detector 3308 based on the decoded result of the request.

Next, a method for multiplexing a legacy device (i.e., an operation of the multiplex apparatus, to which the pseudo legacy device is applied) in the third embodiment according to the present invention will be described with reference to the attached drawings. In this embodiment, the pseudo legacy device is the pseudo timer. Here, it is assumed that the I/O controller 3500, the timer 3600 and the interrupt controller 3700 are active while the I/O controller 4500, the timer 4600 and the interrupt controller 4700 stand by.

Figure 8:
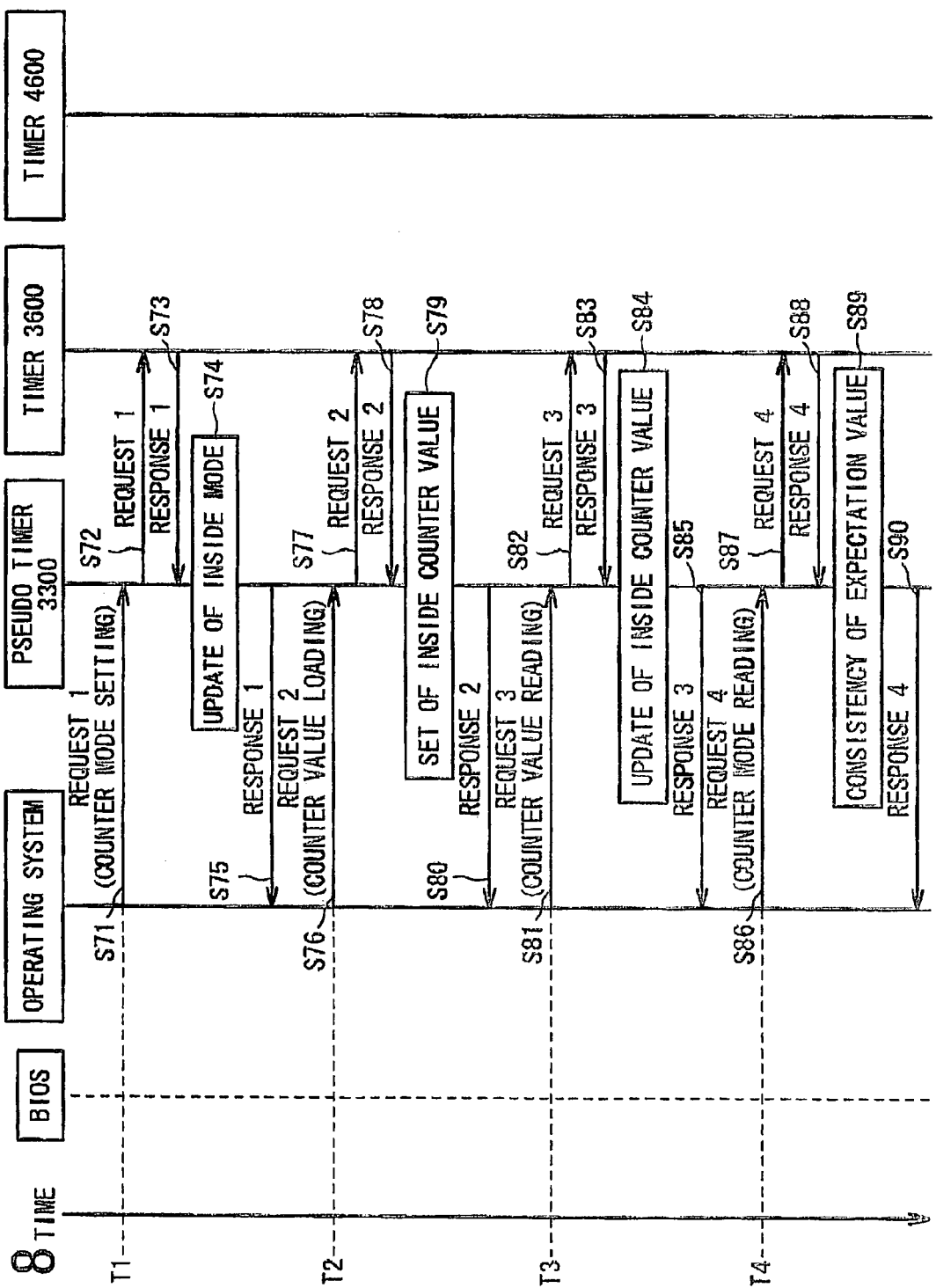
FIG. 8 is a timing chart showing the operation of the multiplex apparatus in the third embodiment according to the present invention.

FIG. 8 is a timing chart showing the operation of the multiplex apparatus (the method for multiplexing a legacy device) in the third embodiment according to the present invention. The operation in the case that the interrupt mode of the timer is the periodic interrupt mode will be described below.

At a time T1, the OS (i.e., the CPU 3000) creates a request 1 for the timer 3600. The request 1 is the counter mode setting request, and further, the interrupt mode is the periodic interrupt mode. The OS transmits the request 1 to the pseudo timer 3300 serving as the pseudo legacy device through the memory controller 3100. Then, the pseudo timer 3300 receives the request 1 (step S71).

The upper I/F 3301 in the pseudo timer 3300 transmits the received request 1 to the lower I/F 3305 and the request buffer 3302. The lower I/F 3305 transmits the request 1 to the cross bridge 3400. The request buffer 3302 holds a copy of the request 1 therein. The cross bridge 3400 transmits the request 1 to the I/O controller 3500 in the active state. The I/O controller 3500 transmits the request 1 to the timer 3600 through the I/O bus 3800 (step S72)

The timer 3600 generates a response 1 in response to the request 1, and then, transmits the response 1 to the I/O controller 3500. The I/O controller 3500 transmits the received response 1 to the lower I/F 3305 in the pseudo timer 3300 (step S73).

The lower I/F 3305 transmits the response 1 to the response buffer 3307. The response buffer 3307 holds the response 1 therein, and further, notifies the pseudo operator 3310 of the reception. The pseudo operator 3310 obtains the request 1 corresponding to the response 1 received by the response buffer 3307 from the request buffer 3302. The request decoder 3311 decodes the acquired request 1. The request 1 is the counter mode setting request. As a consequence, the counter mode unit 3314 holds therein a mode of the response 1 (i.e., a mode set in the timer 3600) (step S74).

Since the request 1 is the counter mode setting request, the comparison error detector 3308 does not compare the response 1 with an expectation value 1. The comparison error detector 3308 transmits this fact to the operation controller 3304. The operation controller 3304 instructs the response selector 3309 to return the response 1 from the timer 3600 stored in the response buffer 3307 to the CPU 3000. The response selector 3309 outputs the response 1 to the upper I/F 3301. The upper I/F 3301 returns the response 1 to the CPU 3000 (i.e., the OS) through the memory controller 3100 (step S75).

Next, at a time T2, the OS (i.e., the CPU 3000) creates a request 2 for the timer 3600. The request 2 is the counter value loading request. The OS transmits the request 2 to the pseudo timer 3300 serving as the pseudo legacy device through the memory controller 3100. And then, the pseudo timer 3300 receives the request 2 (step S76).

The upper I/F 3301 in the pseudo timer 3300 transmits the received request 2 to the lower I/F 3305 and the request buffer 3302. The lower I/F 3305 transmits the request 2 to the cross bridge 3400. The request buffer 3302 holds a copy of the request 2 therein. The cross bridge 3400 transmits the request 2 to the I/O controller 3500 in the active state. The I/O controller 3500 transmits the request 2 to the timer 3600 through the I/O bus 3800 (step S77)

The timer 3600 generates a response 2 in response to the request 2, and then, transmits the response 2 to the I/O controller 3500. The I/O controller 3500 transmits the received response 2 to the lower I/F 3305 in the pseudo timer 3300 (step S78).

The lower I/F 3305 transmits the response 2 to the response buffer 3307. The response buffer 3307 holds the response 2 therein, and further, notifies the pseudo operator 3310 of the reception. The request decoder 3311 in the pseudo operator 3310 obtains the request 2 corresponding to the response 2 received by the response buffer 3307 from the request buffer 3302. The request decoder 3311 decodes the obtained request 2. The request 2 is the counter value loading request. As a consequence, the load value (3313) is updated with a value of the response 2 (i.e., a value loaded on the timer 3600) (step S79).

Since the request 2 is the counter value loading request, the comparison error detector 3308 does not compare the response 2 with an expectation value 2. The comparison error detector 3308 transmits this fact to the operation controller 3304. The operation controller 3304 instructs the response selector 3309 to return the response 2 from the timer 3600 stored in the response buffer 3307 to the CPU 3000. The response selector 3309 outputs the response 2 to the upper I/F 3301. The upper I/F 3301 returns the response 2 to the CPU 3000 (i.e., the OS) through the memory controller 3100 (step S80).

In addition, at a time T3, the OS (i.e., the CPU 3000) creates a request 3 for the timer 3600. The request 3 is the counter value reading request. The OS transmits the request 3 to the pseudo timer 3300 through the memory controller 3100. And then, the pseudo timer 3300 receives the request 3 (step S81).

The upper I/F 3301 in the pseudo timer 3300 transmits the received request 3 to the lower I/F 3305 and the request buffer 3302. The lower I/F 3305 transmits the request 3 to the cross bridge 3400. The request buffer 3302 holds a copy of the request 3 therein. The cross bridge 3400 transmits the request 3 to the I/O controller 3500 in the active state. The I/O controller 3500 transmits the request 3 to the timer 3600 through the I/O bus 3800 (step S82).

The timer 3600 generates a response 3 in response to the request 3, and then, transmits the response 3 to the I/O controller 3500. The I/O controller 3500 transmits the received response 3 to the lower I/F 3305 in the pseudo timer 3300 (step S83).

The lower I/F 3305 transmits the response 3 to the response buffer 3307. The response buffer 3307 holds the response 3 therein, and further, notifies the pseudo operator 3310 of the reception. The request decoder 3311 in the pseudo operator 3310 obtains the request 3 corresponding to the response 3 received by the response buffer 3307 from the request buffer 3302. The request decoder 3311 decodes the obtained request 3. The request 3 is the counter value reading request. As a consequence, the counter value (3312) is updated with a value of the response 3 (step S84).

Since the request 3 is the counter value reading request, the comparison error detector 3308 does not compare the response 3 with an expectation value 3. The comparison error detector 3308 transmits this fact to the operation controller 3304. The operation controller 3304 instructs the response selector 3309 to return the response 3 from the timer 3600 stored in the response buffer 3307 to the CPU 3000. The response selector 3309 outputs the response 3 to the upper I/F 3301. The upper I/F 3301 returns the response 3 to the CPU 3000 (i.e., the OS) through the memory controller 3100 (step S85).

Additionally, at a time T4, the OS (i.e., the CPU 3000) creates a request 4 for the timer 3600. The request 4 is the counter mode reading request. The OS transmits the request 4 to the pseudo timer 3300 through the memory controller 3100. Then, the pseudo timer 3300 receives the request 4 (step S86).

The upper I/F 3301 in the pseudo timer 3300 transmits the received request 4 to the lower I/F 3305 and the request buffer 3302. The lower I/F 3305 transmits the request 4 to the cross bridge 3400. The request buffer 3302 holds a copy of the request 4 therein. The cross bridge 3400 transmits the request 4 to the I/O controller 3500 in the active state. The I/O controller 3500 transmits the request 4 to the timer 3600 through the I/O bus 3800 (step S87).

The timer 3600 generates a response 4 in response to the request 4, and then, transmits the response 4 to the I/O controller 3500. The I/O controller 3500 transmits the received response 4 to the lower I/F 3305 in the pseudo timer 3300 (step S88).

The lower I/F 3305 transmits the response 4 to the response buffer 3307. The response buffer 3307 holds the response 4 therein, and further, notifies the pseudo operator 3310 of the reception. The request decoder 3311 in the pseudo operator 3310 obtains the request 4 corresponding to the response 4 received by the response buffer 3307 from the request buffer 3302. The request decoder 3311 decodes the obtained request 4. The request 4 is the counter mode reading request. When the request decoder 3311 confirms that the request 4 is the mode reading request, the request decoder 3311 generates an expectation value 4, which is expected as a mode value to be returned from the timer 3600, based on the request 4. Then, the request decoder 3311 outputs the expectation value 4 to the comparison error detector 3308. The comparison error detector 3308 compares the response 4 in the response buffer 3307 with the expectation value 4, and thereafter, outputs the comparison result to the operation controller 3304. The operation controller 3304 judges whether or not there occurs discrepancy between the expectation value 4 and the response 4 (step S89).

The operation controller 3304 instructs the response selector 3309 to return the response 4 (which is stored in the response buffer 3307) from the timer 3600 to the CPU 3000, in the case of no occurrence of discrepancy between the expectation value 4 and the response 4. The response selector 3309 outputs the response 4 to the upper I/F 3301. The upper I/F 3301 returns the response 4 to the CPU 3000 (i.e., the OS) through the memory controller 3100 (step S90).

Figure 9:
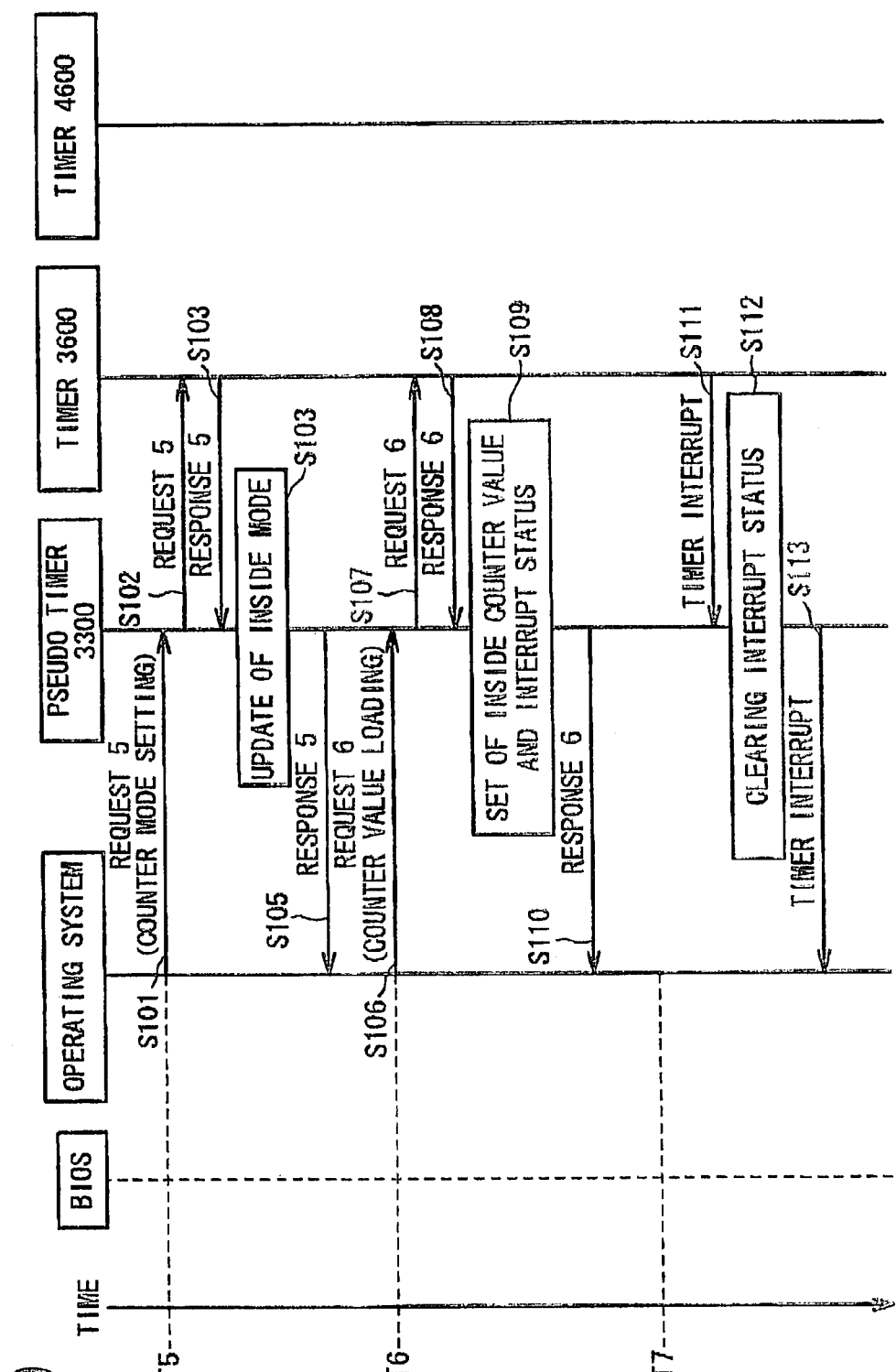
FIG. 9 is a timing chart showing anther operation of the multiplex apparatus in the third embodiment according to the present invention.

FIG. 9 is a timing chart showing anther operation of the multiplex apparatus (the method for multiplexing a legacy device) in the third embodiment according to the present invention. The operation in the case that the interrupt mode of the timer is the one-shot interrupt mode will be described below.

At a time T5, the OS (i.e., the CPU 3000) creates a request 5 for the timer 3600. The request 5 is the mode setting request, and further, the interrupt mode is the one-shot interrupt mode.

The request 5 is processed in the same manner (in steps S101 to S105) as the processing as to the request 1 shown in FIG. 8 (in steps S71 to S75).

Next, at a time T6, the OS (i.e., the CPU 3000) creates a request 6 for the timer 3600. The request 6 is the counter value loading request. The OS transmits the request 6 to the pseudo timer 3300 serving as the pseudo legacy device through the memory controller 3100. Then, the pseudo timer 3300 receives the request 6 (step S106).

The upper I/F 3301 in the pseudo timer 3300 transmits the received request 6 to the lower I/F 3305 and the request buffer 3302. The lower I/F 3305 transmits the request 6 to the cross bridge 3400. The request buffer 3302 holds a copy of the request 6 therein. The cross bridge 3400 transmits the request 6 to the I/O controller 3500 in the active state. The I/O controller 3500 transmits the request 6 to the timer 3600 through the I/O bus 3800 (step S107).

The timer 3600 generates a response 6 in response to the request 6, and then, transmits the response 6 to the I/O controller 3500. The I/O controller 3500 transmits the received response 6 to the lower I/F 3305 in the pseudo timer 3300 (step S108).

The lower I/F 3305 transmits the response 6 to the response buffer 3307. The response buffer 3307 holds the response 6 therein, and further, notifies the pseudo operator 3310 of the reception. The request decoder 3311 in the pseudo operator 3310 obtains the request 6 corresponding to the response 6 received by the response buffer 3307 from the request buffer 3302. The request decoder 3311 decodes the obtained request 6. The request 6 is the counter value loading request. As a consequence, the load value (3313) is updated with a value of the response 6 (i.e., a value loaded on the timer 3600) Furthermore, since the timer 3600 has been set in the one-shot interrupt mode and the counting has been started at the counter value loading request of the request 6 in the processing at the time T5 (in steps S101 to S105), the value of the interrupt status 3315 is set to 1. The fact that the value of the interrupt status 3315 is 1 indicates that no interrupt has occurred yet after the timer 3600 has been started to be operated in the one-shot interrupt mode (step S109).

Since the request 6 is the counter value loading request, the comparison error detector 3308 does not compare the response 6 with an expectation value 6. The comparison error detector 3308 transmits this fact to the operation controller 3304. The operation controller 3304 instructs the response selector 3309 to return the response 6 from the timer 3600 stored in the response buffer 3307 to the CPU 3000. The response selector 3309 outputs the response 6 to the upper I/F 3301. The upper I/F 3301 returns the response 6 to the CPU 3000 (i.e., the OS) through the memory controller 3100 (step S110).

At a time T7, a timer interrupt is generated inside of the timer 3600. The timer 3600 transmits the timer interrupt as an interrupt message to the lower I/F 3305 in the pseudo timer 3300 through the I/O controller 3500 (step S111).

The lower I/F 3305 transmits the timer interrupt to the timer interrupt detector 3306 and the response buffer 3307. When the timer interrupt detector 3306 detects that the timer interrupt (i.e., the interrupt message) has been issued from the timer 3600, the timer interrupt detector 3306 notifies the pseudo operator 3310 of that matter. The value of the interrupt status 3315 in the pseudo operator 3310 is cleared to 0. The fact that the value of the interrupt status 3315 is 0 indicates that the interrupt has been generated after the timer 3600 has been started to be operated in the one-shot interrupt mode (step S112).

In the meantime, the response buffer 3307 transmits the timer interrupt to the CPU 3000 through the upper I/F 3301 (step S113).

Figure 10:
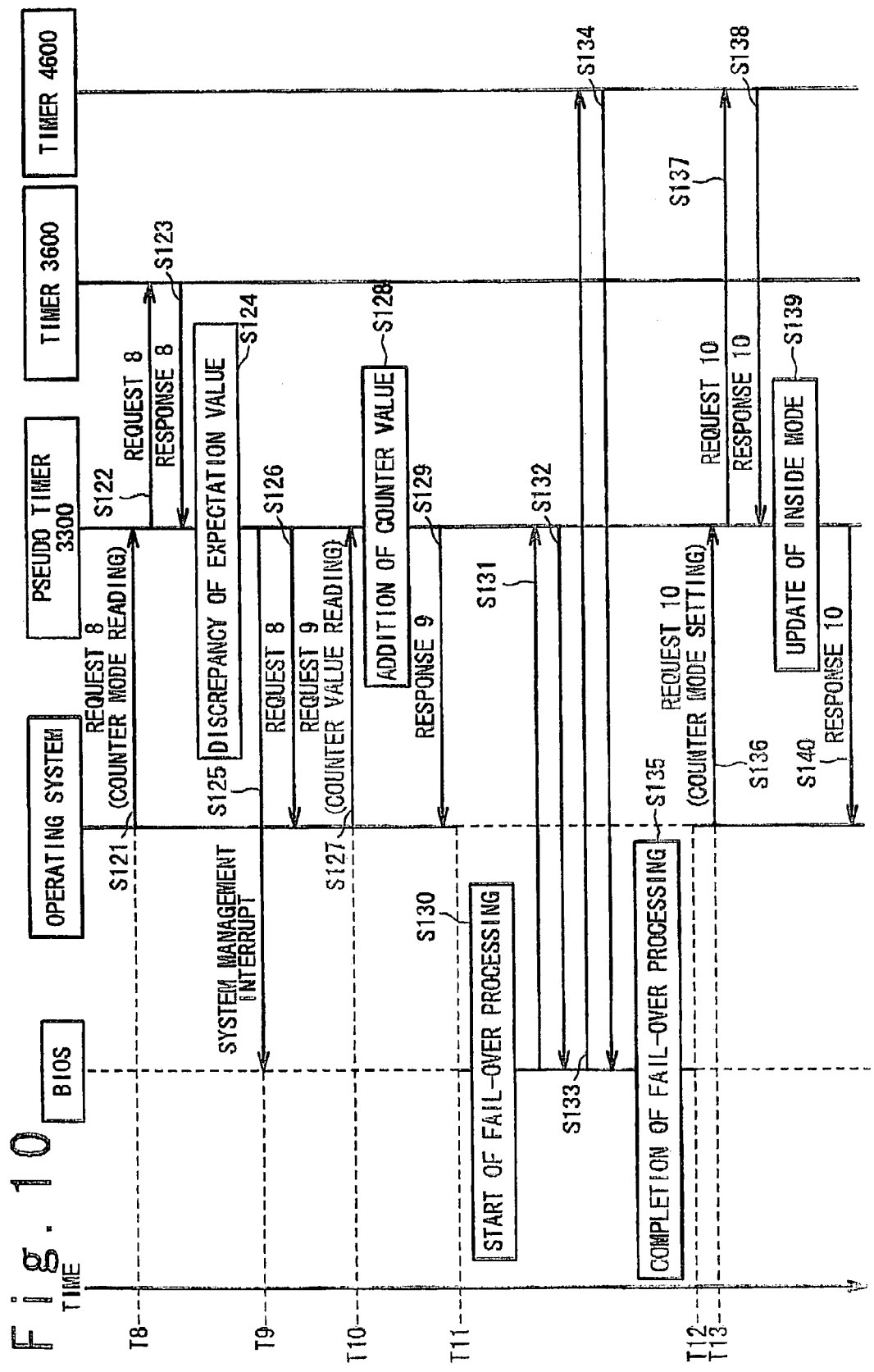
FIG. 10 is a timing chart showing a further operation by the method for multiplexing a legacy device in the third embodiment according to the present invention.

FIG. 10 is a timing chart showing a further operation by the method for multiplexing a legacy device in the third embodiment according to the present invention. Here, the operation in the case that a trouble occurs will be described.

At a time T8, the OS (i.e., the CPU 3000) creates a request 8 for the timer 3600. The request 8 is the counter mode reading request. The OS transmits the request 8 to the pseudo timer 3300 through the memory controller 3100. And then, the pseudo timer 3300 receives the request 8 (step S121).

The upper I/F 3301 in the pseudo timer 3300 transmits the received request 8 to the lower I/F 3305 and the request buffer 3302. The lower I/F 3305 transmits the request 8 to the cross bridge 3400. The request buffer 3302 holds a copy of the request 8 therein. The cross bridge 3400 transmits the request 8 to the I/O controller 3500 in the active state. The I/O controller 3500 transmits the request 8 to the timer 3600 through the I/O bus 3800 (step S122).

The timer 3600 generates a response 8 in response to the request 8, and then, transmits the response 8 to the I/O controller 3500. The I/O controller 3500 transmits the received response 8 to the lower I/F 3305 in the pseudo timer 3300 (step S123).

The lower I/F 3305 transmits the response 8 to the response buffer 3307. The response buffer 3307 holds the response 8 therein, and further, notifies the pseudo operator 3310 of the reception. The request decoder 3311 in the pseudo operator 3310 obtains the request 8 corresponding to the response 8 received by the response buffer 3307 from the request buffer 3302. The request decoder 3311 decodes the obtained request 8. The request 8 is the counter mode reading request. When the request decoder 3311 confirms that the request 8 is the counter mode reading request, the request decoder 3311 generates an expectation value 8, which is expected as a mode value to be returned from the timer 3600, based on the request 8. Then, the request decoder 3311 outputs the expectation value 8 to the comparison error detector 3308. The comparison error detector 3308 compares the response 8 in the response buffer 3307 with the expectation value 8, and thereafter, outputs the comparison result to the operation controller 3304. The operation controller 3304 judges whether or not there occurs discrepancy between the expectation value 8 and the response 8 (step S124).

In the case of the occurrence of discrepancy between the expectation value 8 and the response 8, the operation controller 3304 issues a system management interrupt at a time T9 (step S125). At the same time, the operation controller 3304 instructs the response selector 3309 to return the expectation value 8 generated by the pseudo operator 3310 to the CPU 3000. The response selector 3309 outputs the expectation value 8 as the response 8 to the upper I/F 3301. The upper I/F 3301 returns the response 8 to the CPU 3000 (i.e., the OS) through the memory controller 3100 (step S126).

Also after the issuance of the system management interrupt, the request may be possibly output to the timer 3600 from the OS before the processing is transferred to the system management interrupt handler. For example, in the FIG. 10, a request 9 is issued from the OS at a time T10. The request 9 is a counter value reading command. However, the timer 3600 cannot return a counter value since a trouble occurs. Therefore, the pseudo timer 3300 returns a pseudo counter value as a response. A value obtained by adding the addition value (3316) to the counter value (3312) in the pseudo operator 3310 is returned as the pseudo counter value. In this manner, it is possible to prevent any occurrence of discrepancy of reverse return of the counter value inside of the operating system.

Specifically, the processing will be performed as follows.

At the time T10, the OS (i.e., the CPU 3000) creates the request 9 with respect to the timer 3600. The request 9 is the counter value reading request. The OS transmits the request 9 to the pseudo timer 3300 through the memory controller 3100. Then, the pseudo timer 3300 receives the request 9 (step S127).

The upper I/F 3301 in the pseudo timer 3300 transmits the received request 9 to the lower I/F 3305 and the request buffer 3302. The request buffer 3302 holds a copy of the request 3 therein The lower I/F 3305 transmits the request 9 to the cross bridge 3400. However, since the trouble occurs, the timer 3600 cannot return the counter value. The time-out detector 3303 monitors the request buffer 3302 and the response buffer 3307, and then, notifies the operation controller 3304 of no return of a response 9 corresponding to the request 9 for a predetermined period of time or longer. The operation controller 3304 acquires, from the pseudo operator 3310, a value (i.e., a pseudo counter value) obtained by adding the addition value (3316) to the counter value (3312), through the comparison error detector 3308 (step S120). Thereafter, the operation controller 3304 returns that value as the response 9 to the CPU 3000 (step S129).

Subsequently, the fail-over processing will be described.

At a time T11, the system management interrupt handler in the BIOS is started to be operated, thereby starting the fail-over processing (step S130). In the fail-over processing, the system management interrupt handler refers to the counter value (3312), the load value (3313), the counter mode (3314) and the interrupt status (3315) held in the pseudo operator 3310 (steps S131 and S132). The system management interrupt handler turns the timer 4600 in the standby state to be in the same state as that of the timer 3600 in the active state based on the counter value (3312) the load value (3313), the counter mode (3314) and the interrupt status (3315) (steps S133 and S134). Upon the completion of the fail-over processing (step S135), the processing is returned from the system management interrupt handler to the OS at a time T12. Requests for the timer created at a time T13 after the fail-over processing are transmitted to the timer 4600 in the newly active state through the cross bridge 3400, the I/O controller 4500 and the I/O bus 4800. Processing in steps S136 to S140 in FIG. 10 is performed with respect to the timer 4600 in the same manner as the processing in steps S71 to S75.

Subsequently, the fail-over processing will be described further.

Figure 11:
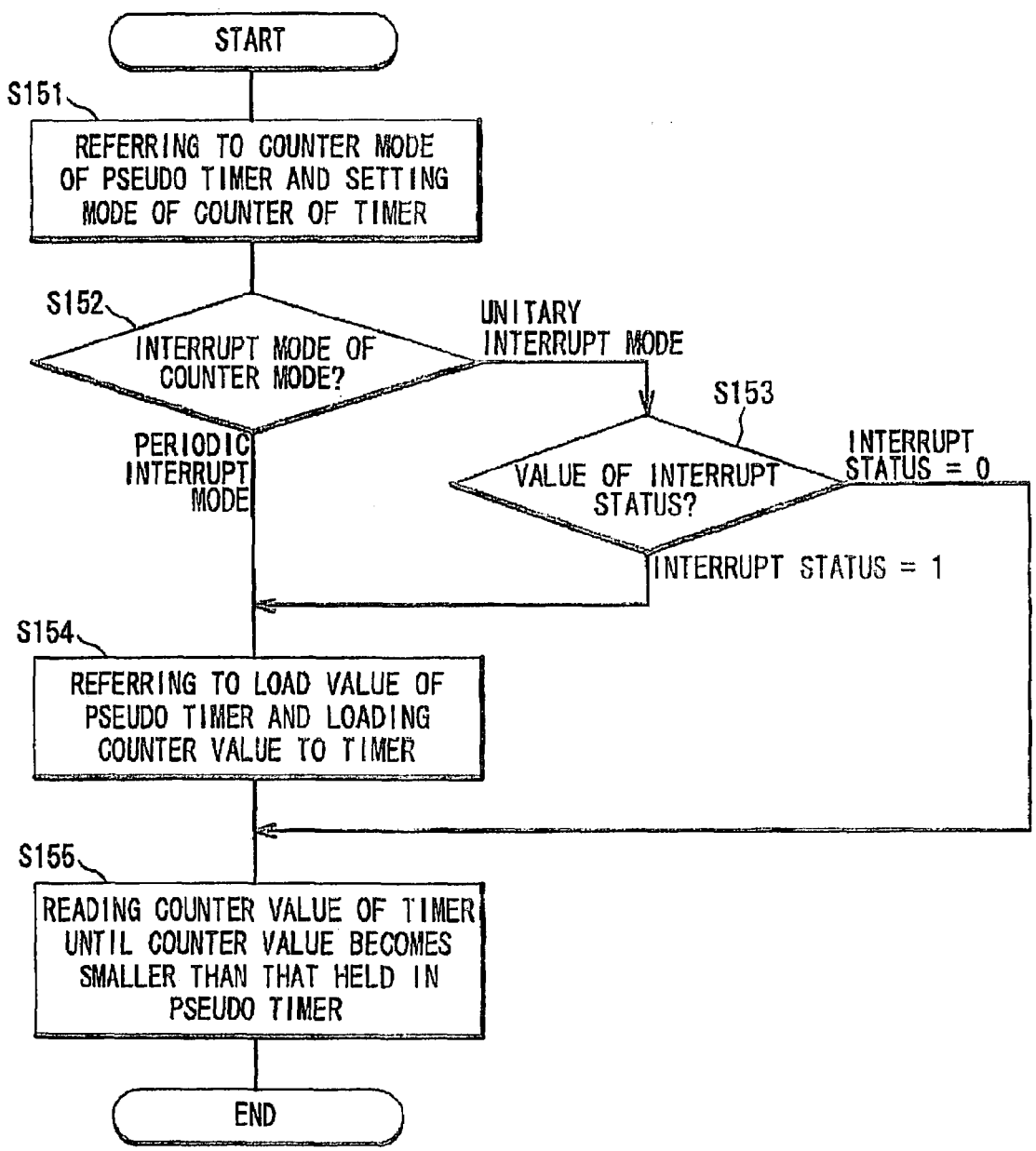
FIG. 11 is a flowchart showing the fail-over processing in the method for multiplexing a legacy device in the third embodiment according to the present invention.

FIG. 11 is a flowchart showing the fail-over processing in the method for multiplexing a legacy device in the third embodiment according to the present invention.

In the step S151, the system management interrupt handler refers to the counter mode (3314), and then, sets a mode of the counter of the destination of the fail-over.

In the step S152, the system management interrupt handler confirms whether the interrupt mode of the counter mode (3314) is the periodic interrupt mode or the one-shot interrupt mode. If the interrupt mode is the one-shot interrupt mode, the control routine proceeds to step S153. In contrast, if the interrupt mode is the periodic interrupt mode, the control routine proceeds to step S154.

In step S153, the system management interrupt handler confirms the value of the interrupt status (3315). If the value of the interrupt status (3315) is 1 at that time, the control routine proceeds to step S154. If the value of the interrupt status (3315) is 0, the control routine proceeds to step S155.

When the value of the interrupt status (3315) is 0, the interrupt is generated after the one-shot interrupt mode has been set. Therefore, if the processing in step S154 is performed, the interrupt is generated again, thereby inducing the occurrence of discrepancy in the operating system. Thus, if the value of the interrupt status (3315) is 0, the control routine proceeds to step S155.

In step S154, the system management interrupt handler refers to the load value 3313, and then, loads the counter value to the timer (i.e., the timer 4600) at the destination of the fail-over.

In step S155, the counter value of the timer (i.e., the timer 4600) is read until the counter value becomes smaller than that held in the counter value 3312.

According to the present invention, since the pseudo timer returns the pseudo response without any discrepancy to the operating system after the occurrence of the timer trouble until the completion of the fail-over, the timer can be failed over without changing any module in the operating system.

The pseudo operator 3310 may be replaced with a pseudo operator 3310a, described below.

Figure 12:
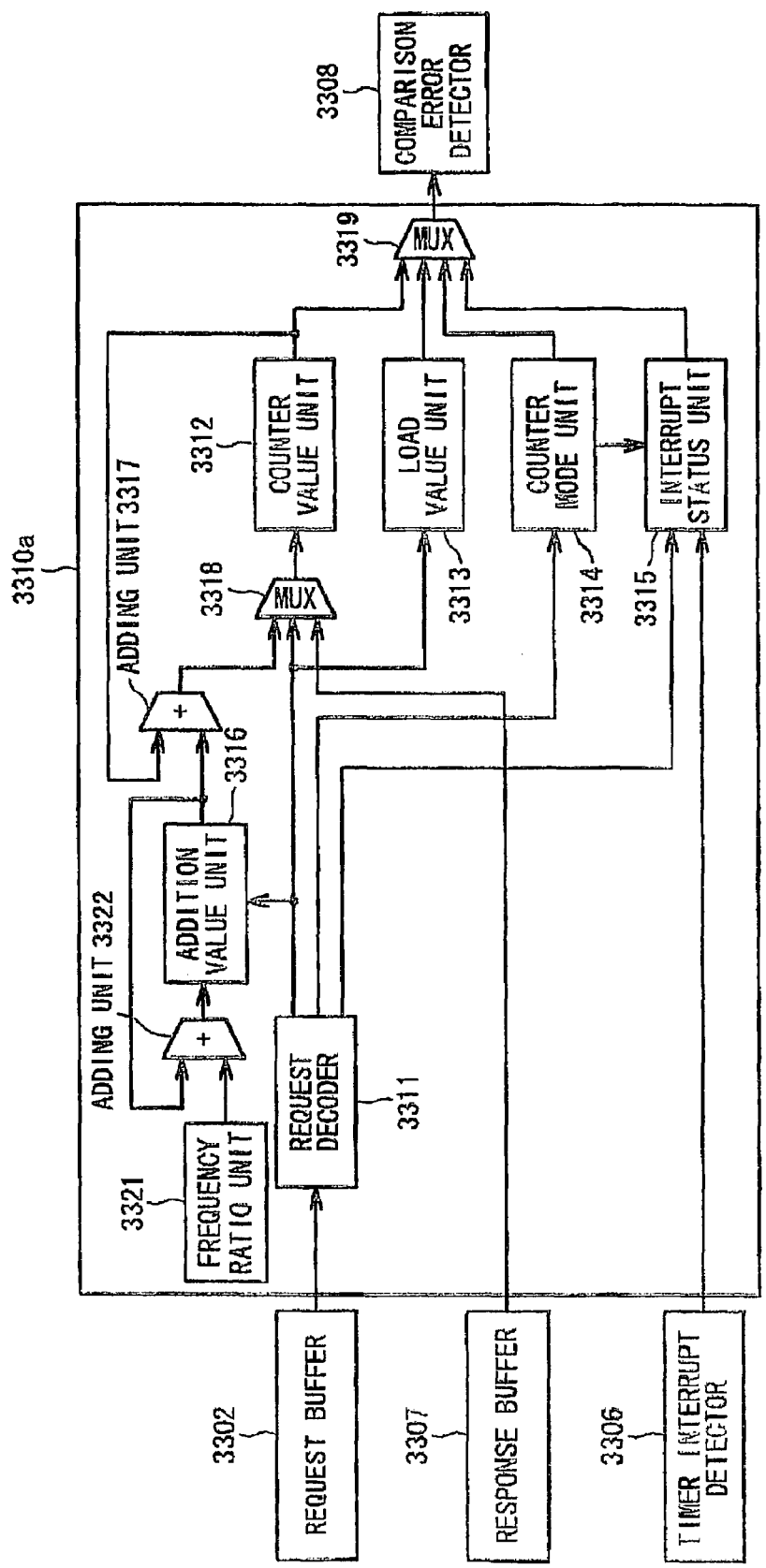
FIG. 12 is a block diagram showing another pseudo operator.

FIG. 12 is a block diagram showing another pseudo operator 3310a. In comparison with the pseudo operator 3310 shown in FIG. 7, the pseudo operator 3310a additionally includes a frequency ratio unit 3321 stores frequency ratio and another adding unit 3322.

The frequency ratio (3318) is a ratio of a clock frequency at which the timer 3600 is operated, to a clock frequency at which the pseudo timer 3300 is operated. The frequency ratio can be set at a fixed point. The addition value 3316 adds a value of the frequency ratio 3318 to a predetermined value every clock at which the pseudo timer 3300 is operated. Upon completion of the counter value reading request, the addition value 3316 is cleared. When the counter value reading request is issued and the pseudo timer 3300 returns the pseudo response after the occurrence of the trouble in the timer 3600, the pseudo timer 3300 returns a value obtained by adding an integer of the addition value 3316 to the counter value 3312.

The pseudo operator 3310 shown in FIG. 7 has returned the value obtained by adding the addition value 3316 to the counter value 3312 as the pseudo response when the counter value reading request has been issued after the occurrence of the trouble in the timer 3600. In contrast, the pseudo operator 3310a shown in FIG. 12 can return the more proper counter value as the pseudo response in consideration of the ratio of the clock frequency of the timer 3600 to the clock frequency of the pseudo timer 3300 and a timing interval after the previous counter value reading request.

As described above, according to the present invention, the legacy device can be multiplexed without changing any module in the operating system. Moreover, the fail-over of the timer can be achieved without changing any module in the operating system.

It is apparent that the present invention is not limited to the above embodiment, that may be modified and changed without departing form the scope and spirit of the present invention.

What is claimed is:

1. A multiplex apparatus comprising: a plurality of systems configured to be connected to each other by links,
   wherein each of said plurality of systems comprises:
   a CPU,
   a pseudo legacy device configured to be electrically connected to said CPU, and
   a legacy device configured to be electrically connected to said pseudo legacy device,
   said pseudo legacy device comprises:

a request buffer configured to store a request when said CPU sends said request through said pseudo legacy device to said legacy device, a pseudo operator configured to execute an emulation with regard to said legacy device based on said request, and store said emulation result including an inside status of said legacy device, and a response buffer configured to store a response to said request from said legacy device, said response buffer is unidirectional and separate from said request buffer, wherein said pseudo legacy device further comprises:

a comparison error detector configured to compare said response outputted from said response buffer with an expectation value outputted from said pseudo operator, wherein said expectation value is obtained by said emulation, and an operation unit configured to output said expectation value as said response to said CPU, when discrepancy occurs between said response and said expectation value, based on said comparison result.

2. The multiplex apparatus according to claim 1, further comprising:

an interrupt controller configured to output an interrupt to said CPU based on a received notification of interrupt, wherein said operation unit outputs said notification of interrupt to said interrupt controller, when discrepancy occurs between said response and said expectation value based on said comparison result.

3. The multiplex apparatus according to claim 1, wherein said pseudo legacy device further comprises:

a response buffer configured to store a response to said request in said legacy device, a time-out detector configured to detect a time-out in which said response buffer cannot receive said response in a predetermined period of time after said request buffer receives said request, and an operation unit configured to output an expectation value as said response to said CPU based on said time-out, wherein said expectation value is obtained by said emulation, and outputted from said pseudo operator.

4. The multiplex apparatus according to claim 3, further comprising:

an interrupt controller configured to output an interrupt to said CPU based on a received notification of interrupt, wherein said pseudo legacy device comprises: a comparison error detector configured to compare said response outputted from said response buffer with said expectation value outputted from said pseudo operator, wherein said operation unit outputs said notification of interrupt to said interrupt controller, when discrepancy occurs between said response and said expectation value based on said comparison result.

5. The multiplex apparatus according to claim 4, wherein said operation unit outputs said notification of interrupt to said interrupt controller based on said time-out.

6. The multiplex apparatus according to claim 1, wherein said legacy device is a timer, and said pseudo legacy device is a pseudo timer.

7. The multiplex apparatus according to claim 1, wherein said request buffer stores only requests for said legacy device sent by said CPU.

8. A method for multiplexing a legacy device, comprising:
(a) providing a computer system which includes;
a plurality of systems configured to be connected to each other by links, wherein each of said plurality of systems comprises:
a CPU,
a pseudo legacy device configured to be electrically connected to said CPU, and
a legacy device configured to be electrically connected to said pseudo legacy device;
(b) storing a request when said CPU sends said request through said pseudo legacy device to said legacy device by said pseudo legacy device;
(c) executing an emulation with regard to said legacy device based on said request by said pseudo legacy device;
(d) storing said emulation result including an inside status of said legacy device by said pseudo legacy device;
(e) storing a response to said request from said legacy device by said pseudo legacy device in a unidirectional response buffer, said unidirectional response buffer being separate from a buffer storing the request;
(f) comparing said response with an expectation value by said pseudo legacy device, wherein said expectation value is obtained by said emulation; and
(g) outputting said expectation value as said response to said CPU, when discrepancy occurs between said response and said expectation value, based on said comparison result, by said pseudo legacy device.

9. The method for multiplexing a legacy device according to claim 8, further comprising:
(h) outputting a notification of interrupt to an interrupt controller by said pseudo legacy device, when discrepancy occurs between said response and said expectation value based on said comparison result,
wherein said interrupt controller outputs an interrupt to said CPU based on said received notification of interrupt.

10. The method for multiplexing a legacy device according to claim 8, further comprising:
(i) detecting a time-out by said pseudo legacy device, wherein said timeout is that said pseudo legacy device cannot receive said response in a predetermined period of time after said pseudo legacy device receives said request; and
(j) outputting an expectation value as said response to said CPU based on said time-out by said pseudo legacy device, wherein said expectation value is obtained by said emulation.

11. The method for multiplexing a legacy device according to claim 10, further comprising:
(k) storing a response to said request from said legacy device by said pseudo legacy device;
(l) comparing said response with an expectation value by said pseudo legacy device, wherein said expectation value is obtained by said emulation; and
(m) outputting a notification of interrupt to an interrupt controller by said pseudo legacy device, when discrepancy occurs between said response and said expectation value based on said comparison result,
wherein said interrupt controller outputs an interrupt to said CPU based on said received notification of interrupt.

12. The method for multiplexing a legacy device according to claim 11, further comprising: (n) outputting said notification of interrupt to said interrupt controller based on said time-out by said pseudo legacy device.

13. The method for multiplexing a legacy device according to claim 8, wherein said legacy device is a timer, and said pseudo legacy device is a pseudo timer.

* * * * *

UNITED STATES PATENT AND TRADEMARK OFFICE
CERTIFICATE OF CORRECTION

| | |
|---|---|
| PATENT NO. | : 7,668,837 B2 |
| APPLICATION NO. | : 11/311283 |
| DATED | : February 23, 2010 |
| INVENTOR(S) | : Yasuyuki Shirano |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 401 days.

Signed and Sealed this

Twenty-eighth Day of December, 2010

David J. Kappos
*Director of the United States Patent and Trademark Office*